US010165621B2

(12) United States Patent
Amis et al.

(10) Patent No.: US 10,165,621 B2
(45) Date of Patent: Dec. 25, 2018

(54) DIRECTIONAL MOBILE AD-HOC NETWORK

(75) Inventors: Alan D. Amis, Plano, TX (US); George A. Deprez, Dallas, TX (US); Steven Vanlaningham, Richardson, TX (US); Rachel A. Rivera, Murphy, TX (US); Bruce A. B. Babb, Plano, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 767 days.

(21) Appl. No.: 13/499,343

(22) PCT Filed: Sep. 30, 2009

(86) PCT No.: PCT/US2009/059048
§ 371 (c)(1),
(2), (4) Date: Mar. 30, 2012

(87) PCT Pub. No.: WO2011/040916
PCT Pub. Date: Apr. 7, 2011

(65) Prior Publication Data
US 2012/0182932 A1    Jul. 19, 2012

(51) Int. Cl.
*H04W 76/40* (2018.01)
*H04W 8/00* (2009.01)
*H04W 28/26* (2009.01)
*H04W 60/00* (2009.01)
*H04W 72/04* (2009.01)
(Continued)

(52) U.S. Cl.
CPC ............ *H04W 76/40* (2018.02); *H04W 8/005* (2013.01); *H04W 28/26* (2013.01); *H04W 60/00* (2013.01); *H04W 72/0446* (2013.01); *H04W 74/0891* (2013.01); *H04W 84/18* (2013.01); *H04W 88/04* (2013.01)

(58) Field of Classification Search
None
See application file for complete search history.

(56) References Cited

U.S. PATENT DOCUMENTS 6,414,955 B1 * 7/2002 Clare et al. ................. 370/390
7,266,085 B2 * 9/2007 Stine ................. H04L 12/5695
370/252

(Continued)

*Primary Examiner* — Christopher M Crutchfield
*Assistant Examiner* — Thinh D Tran
(74) *Attorney, Agent, or Firm* — Angel N. Gerdzhikov; Donna P. Suchy; Daniel M. Barbieri

(57) ABSTRACT

A method for directional mobile ad-hoc communication may include transmitting a join message from a first node to a second node, receiving an accept message from the second node including a TDMA frame slot reassignment correlating to an available TDMA frame slot in a TDMA frame associated with the second node, reassigning a TDMA frame slot for the first node in the TDMA frame associated with the first node according to the frame slot reassignment, and assigning a TDMA frame slot for the second node in the TDMA frame of the first node. It may also comprise executing a discovery protocol to configure a directional mobile ad-hoc communication network between a first node and as second node, transmitting a bandwidth reservation request message from the first node to the second node, receiving a bandwidth reservation response message from the second node, and enabling a relay node.

18 Claims, 38 Drawing Sheets

(51) Int. Cl.
*H04W 74/08* (2009.01)
*H04W 84/18* (2009.01)
*H04W 88/04* (2009.01)

(56) References Cited

U.S. PATENT DOCUMENTS

| | | | | |
|---|---|---|---|---|
| 7,522,628 | B1* | 4/2009 | Elliott | H04Q 11/0062 370/328 |
| 8,072,928 | B2* | 12/2011 | Sinha | H04W 16/12 370/329 |
| 2001/0036810 | A1* | 11/2001 | Larsen | 455/11.1 |
| 2002/0129160 | A1* | 9/2002 | Habetha | 709/236 |
| 2004/0032847 | A1* | 2/2004 | Cain | H04B 7/2643 370/338 |
| 2005/0090201 | A1* | 4/2005 | Lengies | H04B 7/18506 455/41.2 |
| 2005/0122955 | A1* | 6/2005 | Lin et al. | 370/351 |
| 2005/0265259 | A1* | 12/2005 | Thubert | H04L 45/46 370/255 |
| 2009/0034491 | A1* | 2/2009 | Adams | H04W 72/1226 370/337 |
| 2009/0074007 | A1* | 3/2009 | Yonge et al. | 370/468 |
| 2016/0119790 | A1* | 4/2016 | Sakoda | H04W 48/08 370/254 |

\* cited by examiner

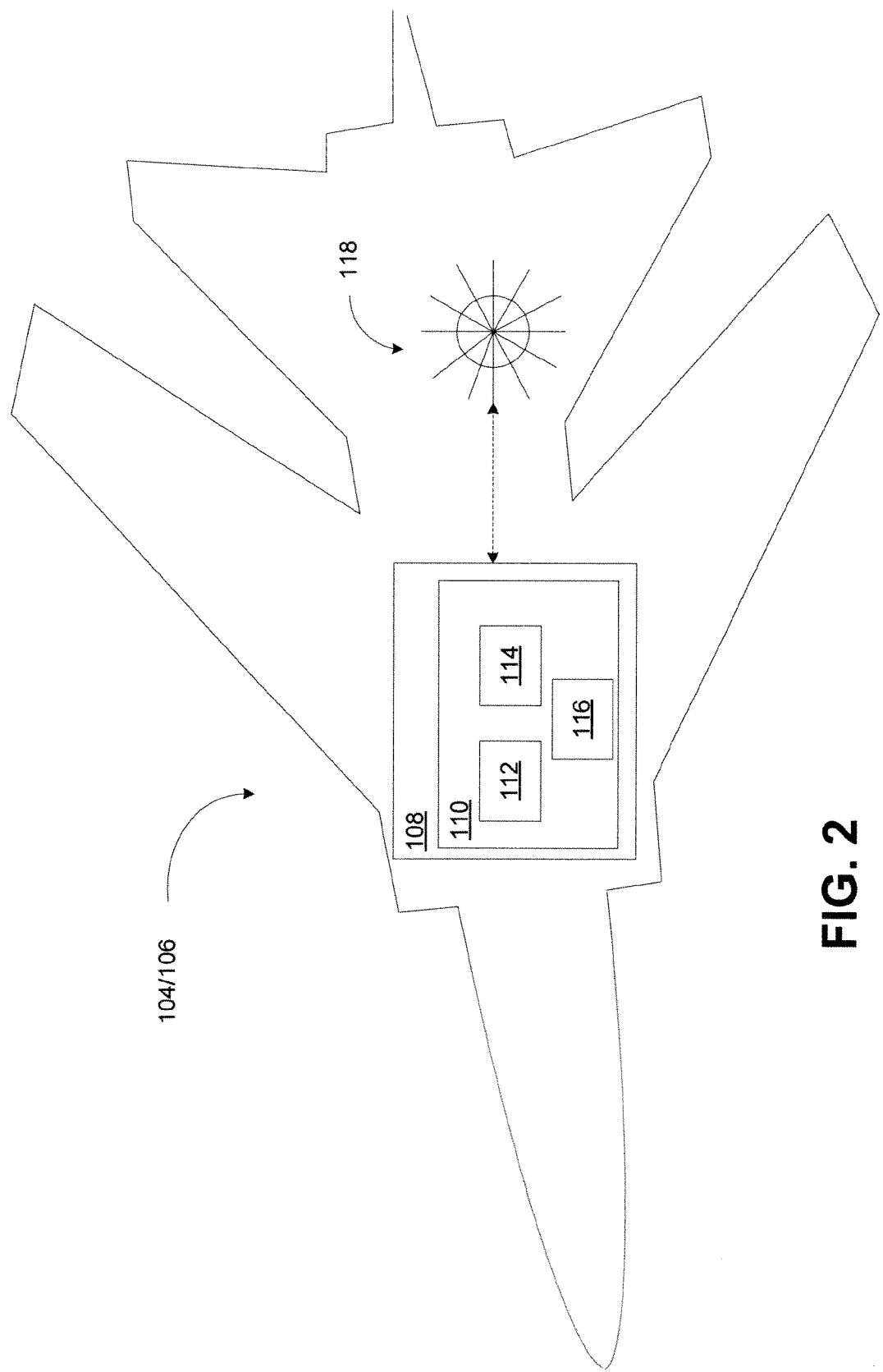

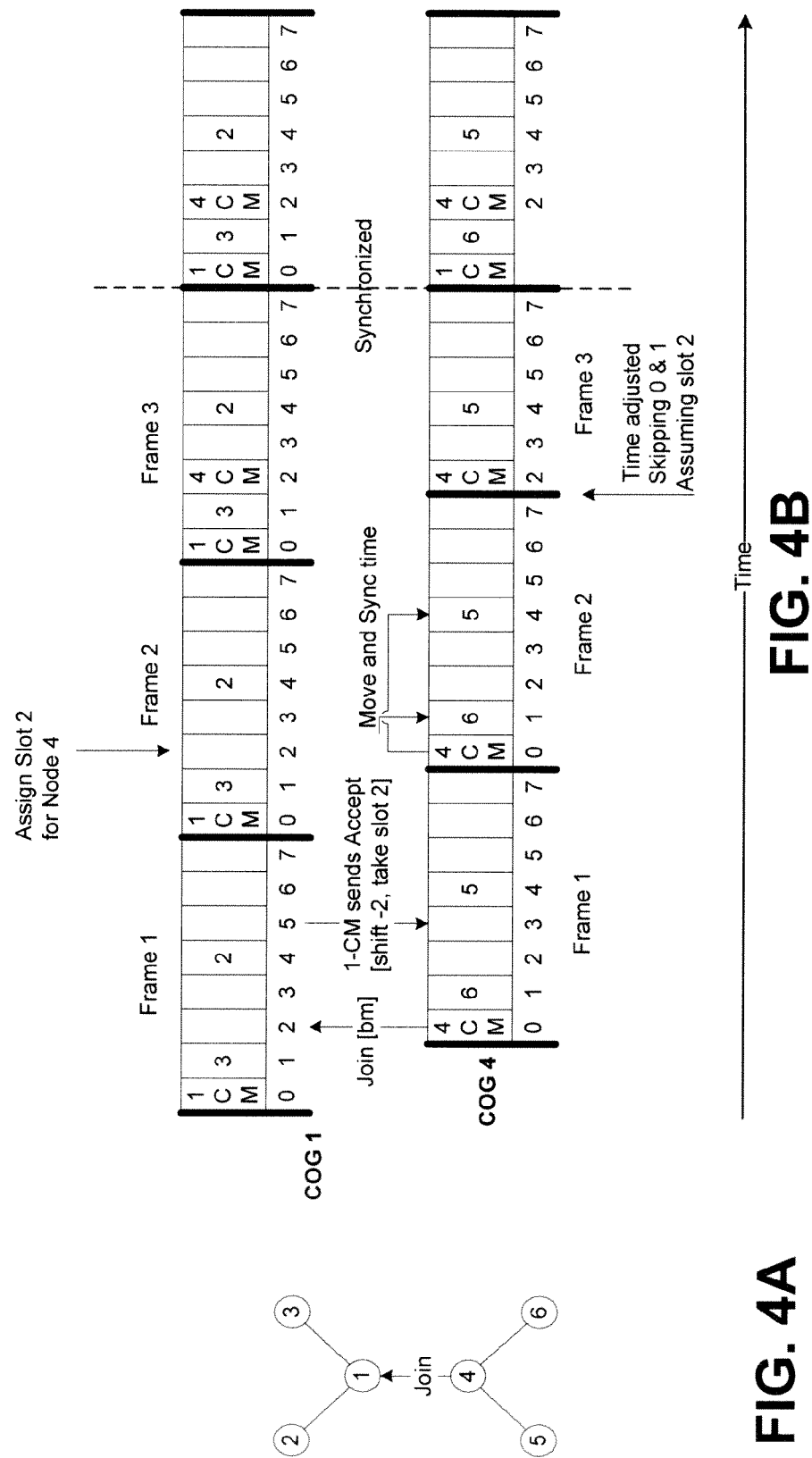

|   | 0 | 8 | 16 | 24 | 32 |
|---|---|---|---|---|---|
| 1 | Sync ||||||
| 2 | Sync |||||
| 3 | Sync |||||
| 4 | Sync |||||
| 5 | Sync |||||
| 6 | Sync |||||
| 7 | Sync |||||
| 8 | Sync |||||
| 9 | Source Node ID | Msg Type | GID | C M | TxSlotID | Neighbor List |
| 10 | Neighbor List |||||
| 11 | Neighbor List | X Velocity | Y Velocity | Z Velocity |
| 12 | Longitude |||||
| 13 | Latitude |||||
| 14 | Altitude |||||
| 15 | GID Bitmap | Future Use |||
| 16 | | | | | |
| 17 | Future Use |||||
|   | Copy of Above |||||
| 33 | |||||

FIG. 5

|   | 0 | 8 | 16 | 24 | 32 |
|---|---|---|---|---|---|
| 1 | Sync || Source Node ID | Msg Type | GID |
| 2 | You Take Slot | I Take Slot | C M | TxSlotID | Neighbor List |
| 3 | Neighbor List |||||
| 4 | Neighbor List | X Velocity | Y Velocity | Z Velocity |
| 5 | Longitude |||||
| 6 | Latitude |||||
| 7 | Altitude |||||
| 8 | GID Bitmap | SubSync | BitSync | Accept ||
|   | Future Use |||||
| 33 | |||||

| | 0 | 8 | 16 | 24 | 32 |
|---|---|---|---|---|---|
| 1 | Sending ID | Sending GID | Neighbor 1 GID | | Neighbor 2 GID |
| 2 | Neighbor 3 GID | Neighbor 4 GID | Neighbor 5 GID | | Reservation Resp |
| 3 | Sending Position Latitude | | Sending Position Longitude | | |
| 4 | Sending Position Altitude | | Sending X Velocity | | |
| 5 | Sending Y Velocity | | Sending Z Velocity | | |
| 6 | HID (1,2,3,…) | Number of Nodes | Sequence Number | | Source ID |
| 7 | Destination ID | Reserved | Destination Position Latitude | | |
| 8 | Destination Position Longitude | | Destination Position Altitude | | |
| 9 | Destination X Velocity | | Destination Y Velocity | | |
| 10 | Destination Z Velocity | | | | |
| 11 | Neighbor Bit Map | | | | |
| N | | | | | |

FIG. 20

| | 0 | 8 | 16 | 24 | 32 |
|---|---|---|---|---|---|
| 1 | Sending ID | Sending GID | Neighbor 1 GID | | Neighbor 2 GID |
| 2 | Neighbor 3 GID | Neighbor 4 GID | Neighbor 5 GID | | Relay Res Resp |
| 3 | Sending Position Latitude | | Sending Position Longitude | | |
| 4 | Sending Position Altitude | | Sending X Velocity | | |
| 5 | Sending Y Velocity | | Sending Z Velocity | | |
| 6 | HID (1,2,3,…) | Number of Nodes | Sequence Number | | Source ID |
| 7 | Destination ID | Relay ID | Relay Destination Position Latitude | | |
| 8 | Relay Destination Position Longitude | | Relay Destination Position Altitude | | |
| 9 | Relay Destination X Velocity | | Relay Destination Y Velocity | | |
| 10 | Relay Destination Z Velocity | | Relay Position Latitude | | |
| 11 | Relay Position Longitude | | Relay Y Velocity | | |
| 12 | Relay X Velocity | | Relay Y Velocity | | |
| 13 | Relay Z Velocity | | | | |
| 14 | Neighbor Bit Map | | | | |
| N | | | | | |

|   | 0 | 8 | 16 | 24 | 32 |
|---|---|---|---|---|---|
| 1 | Sending ID | Sending GID | Neighbor 1 GID | Neighbor 2 GID | |
| 2 | Neighbor 3 GID | Neighbor 4 GID | Neighbor 5 GID | Reserv Expansion | |
| 3 | Sending Position Latitude | | Sending Position Longitude | | |
| 4 | Sending Position Altitude | | Sending X Velocity | | |
| 5 | Sending Y Velocity | | Sending Z Velocity | | |
| 6 | HID (1,2,3,...) | Number of Nodes | Sequence Number | Source ID | |
| 7 | Destination ID | Relay ID | Receiver Position Latitude | | |
| 8 | Receiver Position Longitude | | Receiver Position Altitude | | |
| 9 | Receiver X Velocity | | Receiver Y Velocity | | |
| 10 | Receiver Z Velocity | | Transmitter Position Latitude | | |
| 11 | Transmitter Position Longitude | | Transmitter Position Altitude | | |
| 12 | Transmitter X Velocity | | Transmitter Y Velocity | | |
| 13 | Transmitter Z Velocity | | TX Bit Map of Slots | | |
| 14 | Available Bit Map of Slots | | | | |
| 15 | Neighbor Bit Map | | | | |
| N | | | | | |

FIG. 21

| | TX | G1 | | | G2 | | | G3 | | G4 | G5 | |
|---|---|---|---|---|---|---|---|---|---|---|---|---|
| RX | | A | D | H | B | G | K | F | I | C | E | J |
| G1 | A | | | | X | | | | | | | |
| | D | | | | | X | | | | X | | |
| | H | | | | X | | | | X | | | | |
| G2 | B | X | | | | | | | X | X | X | |
| | G | | | X | | | X | | | | | |
| | K | | X | | | | | | | | | X |
| G3 | F | | | | X | | | | | X | | |
| | I | | | X | X | | | | | X | | X |
| G4 | C | | X | | X | | | | X | | | |
| G5 | E | | | | X | | X | | | | | |
| | J | | | | | X | | X | | | | |

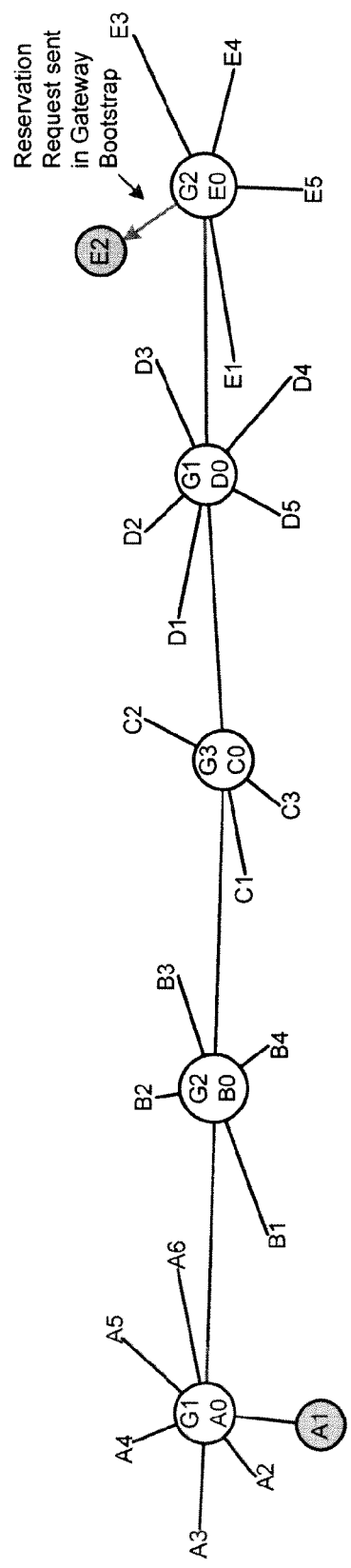
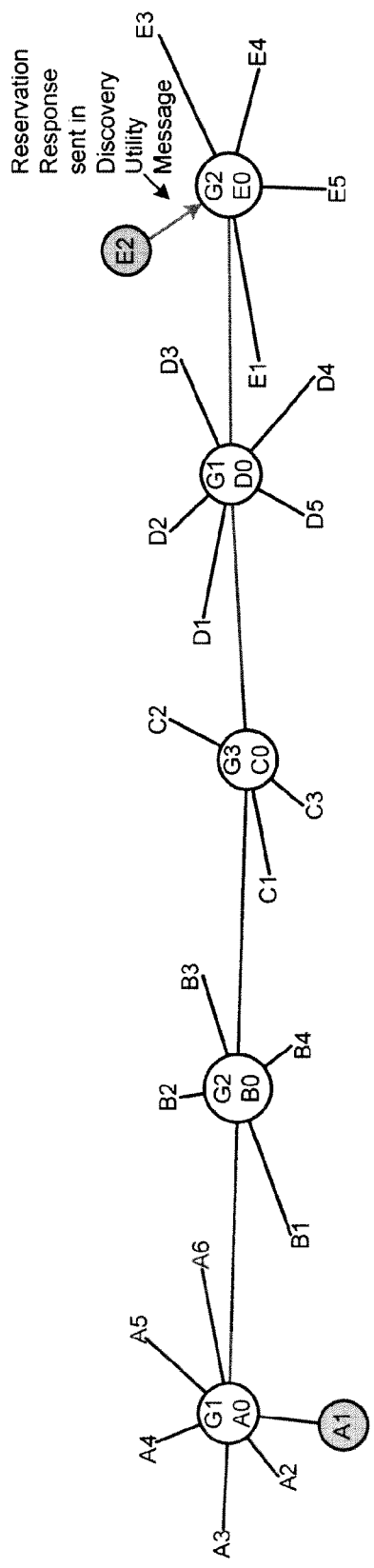
FIG. 27
FIG. 28

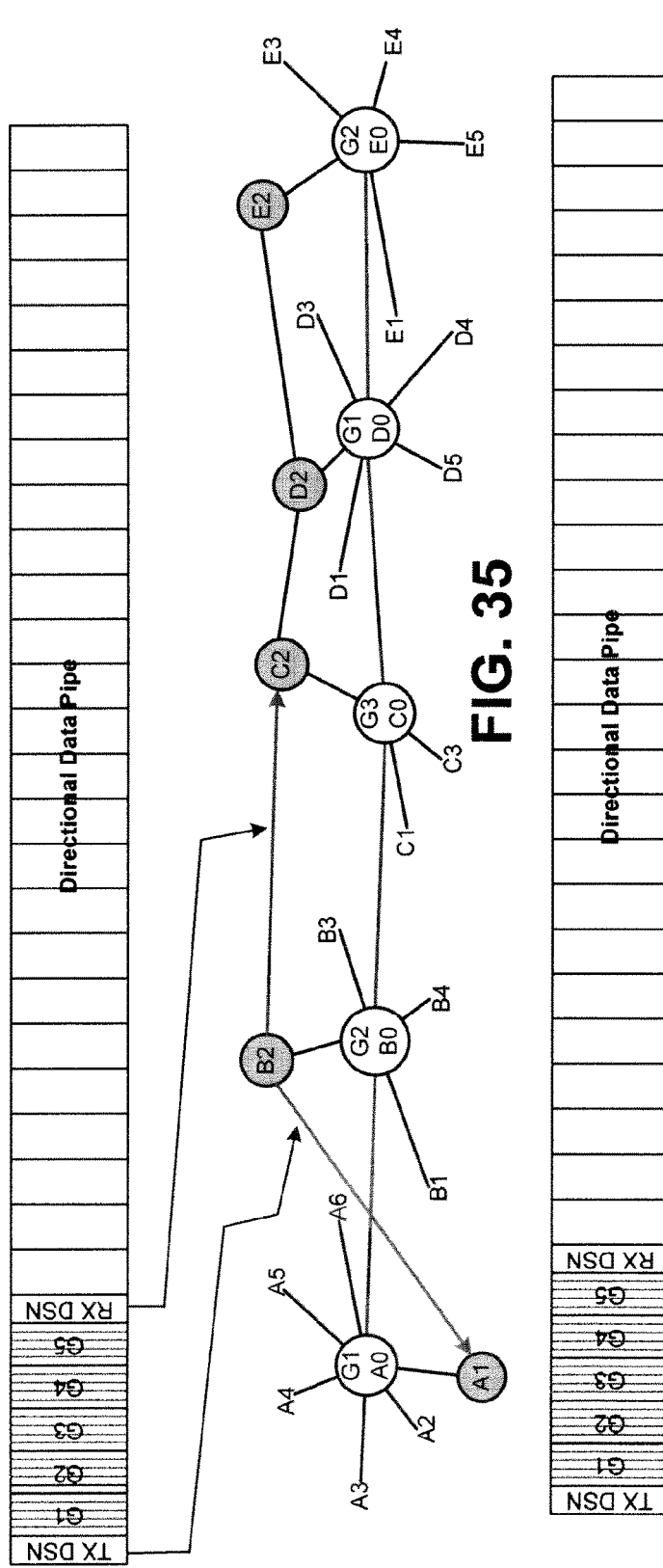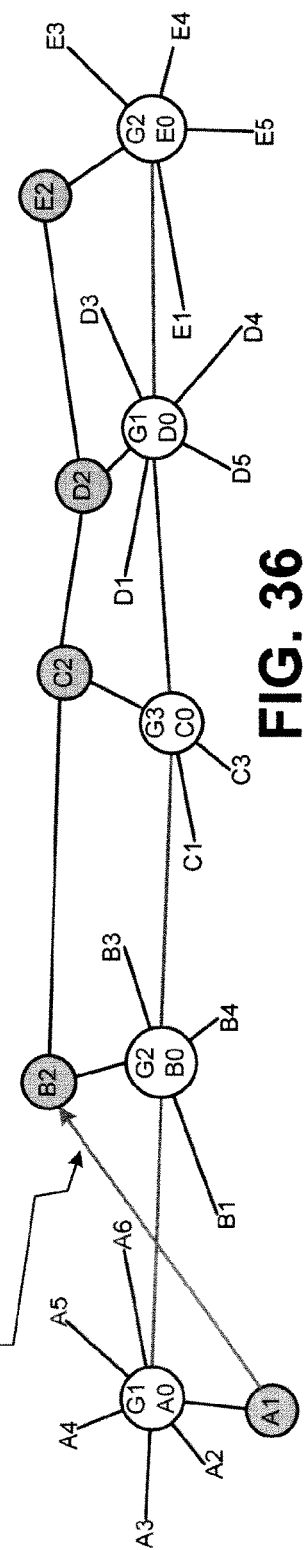
FIG. 35
FIG. 36

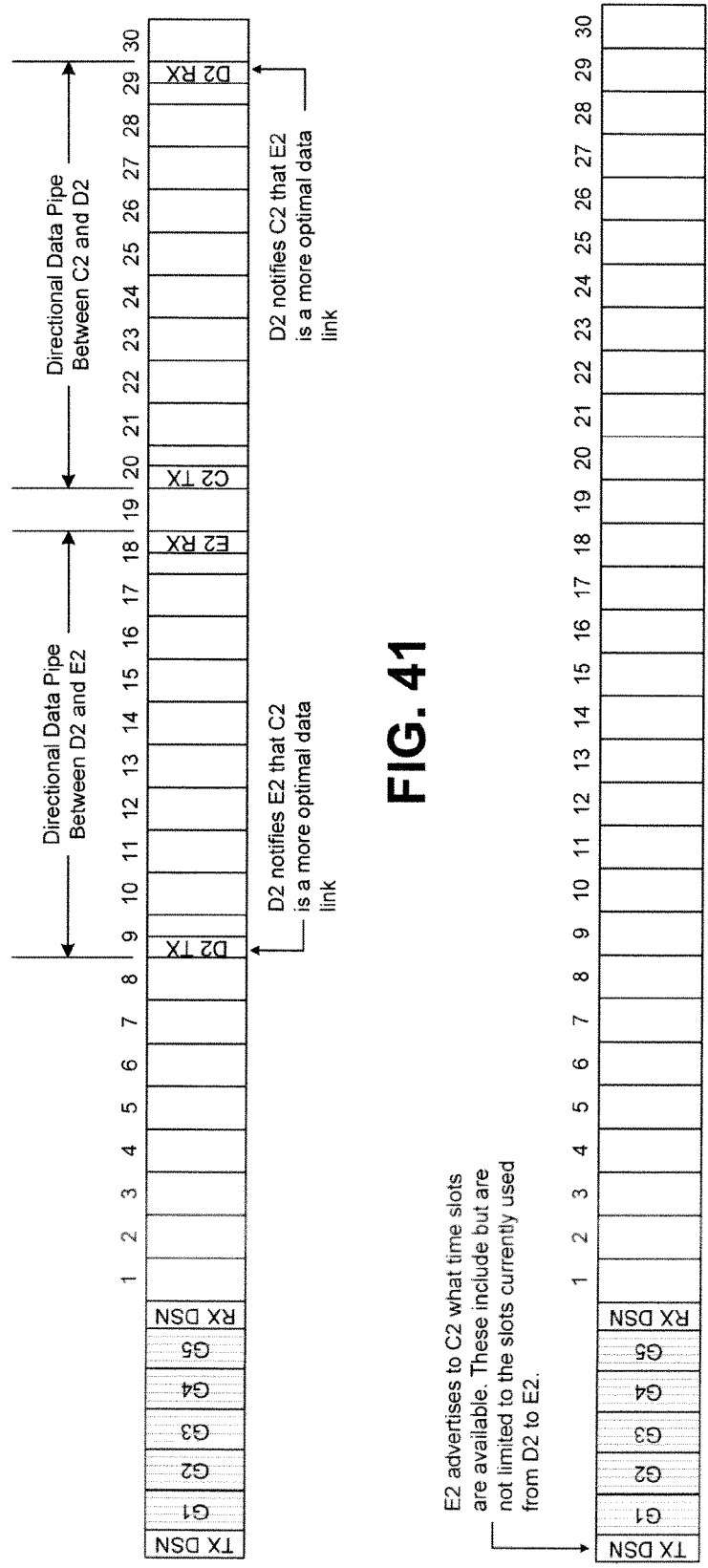

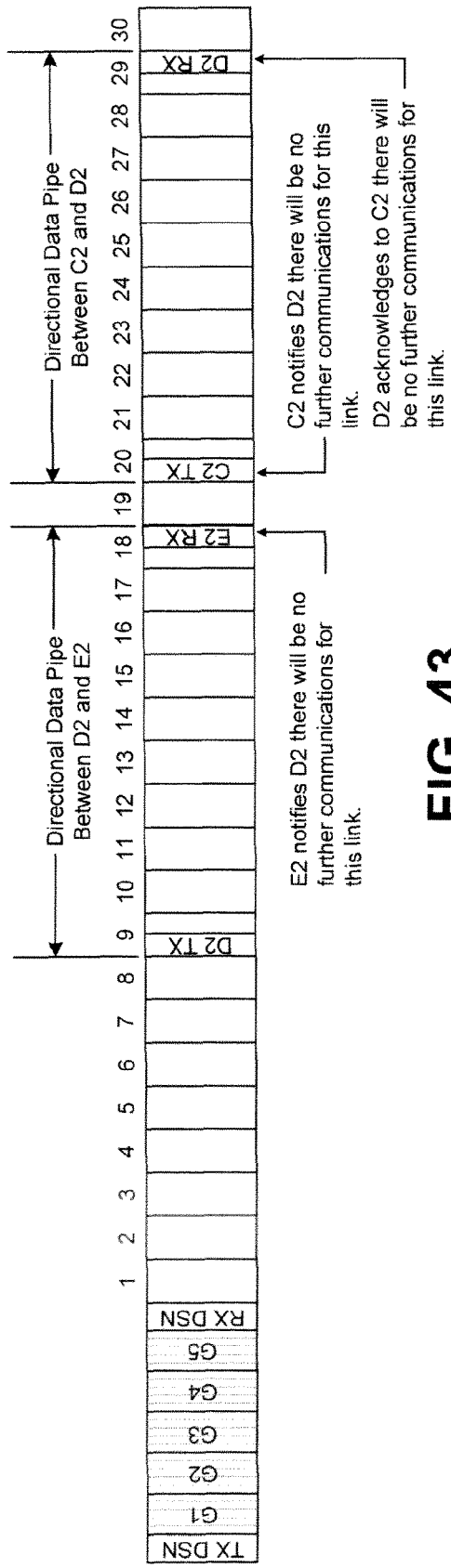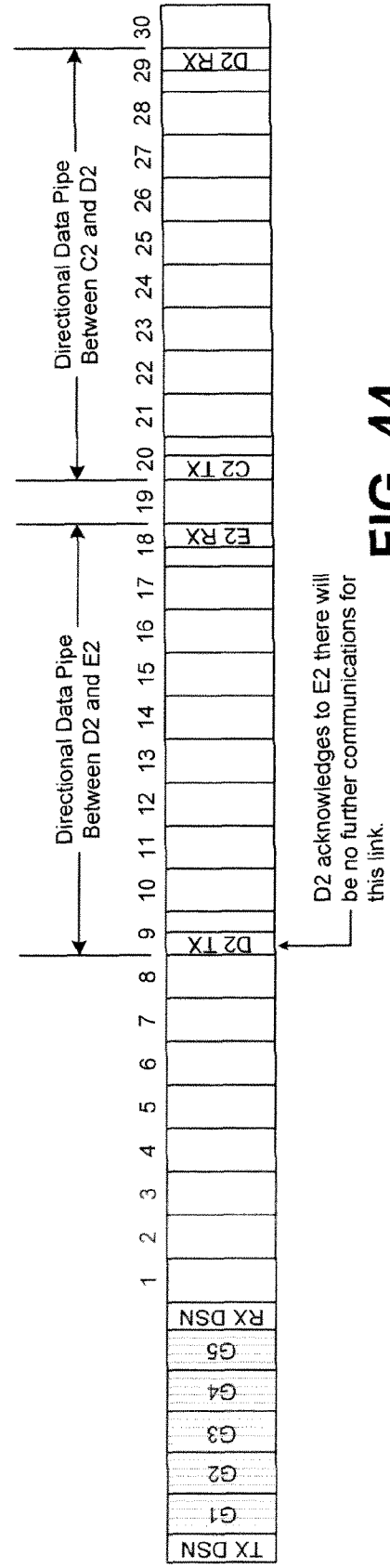

5110 transmitting a join message from a first node to a second node;

5120 receiving an accept message from the second node including a TDMA frame slot reassignment correlating to an available TDMA frame slot in a TDMA frame associated with the second node;

5130 reassigning a TDMA frame slot for the first node in the TDMA frame associated with the first node according to the frame slot reassignment received from the second node;

5140 assigning a TDMA frame slot for the second node in the TDMA frame of the first node 5150 establishing a network infrastructure for inter-group communications 5160 establishing a bandwidth reservation between the first node and the second node

FIG. 51

5110 transmitting a join message from a first node to a second node;

5120 receiving an accept message from the second node including a TDMA frame slot reassignment correlating to an available TDMA frame slot in a TDMA frame associated with the second node;

5130 reassigning a TDMA frame slot for the first node in the TDMA frame associated with the first node according to the frame slot reassignment received from the second node;

5140 assigning a TDMA frame slot for the second node in the TDMA frame of the first node 5150 establishing a network infrastructure for inter-group communications 5160 establishing a bandwidth reservation between the first node and the second node 5202 receiving a TDMA frame offset from the second node 5204 syncing the TDMA frame associated with the first node according to the TDMA frame offset

FIG. 52

5110 transmitting a join message from a first node to a second node;

5120 receiving an accept message from the second node including a TDMA frame slot reassignment correlating to an available TDMA frame slot in a TDMA frame associated with the second node;

5130 reassigning a TDMA frame slot for the first node in the TDMA frame associated with the first node according to the frame slot reassignment received from the second node;

5140 assigning a TDMA frame slot for the second node in the TDMA frame of the first node 5150 establishing a network infrastructure for inter-group communications 5160 establishing a bandwidth reservation between the first node and the second node 5302 transmitting a reconfigure message including an TDMA frame slot reassignment for a third node from the first node to the third node

FIG. 53

5110 transmitting a join message from a first node to a second node;

5120 receiving an accept message from the second node including a TDMA frame slot reassignment correlating to an available TDMA frame slot in a TDMA frame associated with the second node;

5130 reassigning a TDMA frame slot for the first node in the TDMA frame associated with the first node according to the frame slot reassignment received from the second node;

5140 assigning a TDMA frame slot for the second node in the TDMA frame of the first node 5150 establishing a network infrastructure for inter-group communications 5160 establishing a bandwidth reservation between the first node and the second node 5402 transmitting an update message including node position and velocity data during a reassigned TDMA frame slot for the first node

FIG. 54

5110 transmitting a join message from a first node to a second node;

5120 receiving an accept message from the second node including a TDMA frame slot reassignment correlating to an available TDMA frame slot in a TDMA frame associated with the second node;

5130 reassigning a TDMA frame slot for the first node in the TDMA frame associated with the first node according to the frame slot reassignment received from the second node;

5140 assigning a TDMA frame slot for the second node in the TDMA frame of the first node 5150 establishing a network infrastructure for inter-group communications 5160 establishing a bandwidth reservation between the first node and the second node 5502 receiving data regarding a position of the second node

FIG. 55

5110 transmitting a join message from a first node to a second node;

5120 receiving an accept message from the second node including a TDMA frame slot reassignment correlating to an available TDMA frame slot in a TDMA frame associated with the second node;

5130 reassigning a TDMA frame slot for the first node in the TDMA frame associated with the first node according to the frame slot reassignment received from the second node;

5140 assigning a TDMA frame slot for the second node in the TDMA frame of the first node 5150 establishing a network infrastructure for inter-group communications 5160 establishing a bandwidth reservation between the first node and the second node 5602 transmitting data via a directional antenna during a reassigned TDMA frame slot for the first node in the TDMA frame associated with the first node according to the position of the second node

FIG. 56

5710 executing a discovery protocol to configure a directional mobile ad-hoc communication network between a first node and a second node 5720 establishing a network infrastructure for inter-group communications 5730 transmitting a bandwidth reservation request message from the first node to the second node 5740 receiving a bandwidth reservation response message from the second node 5750 enabling a relay node

FIG. 57

5710 executing a discovery protocol to configure a directional mobile ad-hoc communication network between a first node and a second node 5720 establishing a network infrastructure for inter-group communications 5730 transmitting a bandwidth reservation request message from the first node to the second node 5740 receiving a bandwidth reservation response message from the second node 5750 enabling a relay node 5802 transmitting a bandwidth reservation relay response message

FIG. 58

5710 executing a discovery protocol to configure a directional mobile ad-hoc communication network between a first node and a second node 5720 establishing a network infrastructure for inter-group communications 5730 transmitting a bandwidth reservation request message from the first node to the second node 5740 receiving a bandwidth reservation response message from the second node 5750 enabling a relay node 5902 detecting when at least one of the first node and the second node is approximately the same distance away from the relay node and a non-relay node 5904 enabling the non-relay node as a relay node 5906 disabling the relay node

FIG. 59

5710 executing a discovery protocol to configure a directional mobile ad-hoc communication network between a first node and a second node 5720 establishing a network infrastructure for inter-group communications 5730 transmitting a bandwidth reservation request message from the first node to the second node 5740 receiving a bandwidth reservation response message from the second node 5750 enabling a relay node 6002 detecting a degraded reservation relay node 6004 detecting an intermediate non-relay node 6006 enabling the non-relay node as a relay node

FIG. 60

DIRECTIONAL MOBILE AD-HOC NETWORK

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC § 119(e) for provisional patent applications, for any and all parent, grandparent, great-grandparent, etc. applications of the Related Application(s)).

Related Applications

The present application constitutes a national stage filing of PCT/US2009/59048, filed Sep. 30, 2009, entitled DIRECTIONAL MOBILE AD-HOC NETWORK.

BACKGROUND

Mobile networking has predominately depended on omni-directional technologies and only used directional links for nailed up backhaul connections. Directional based technologies may be desirable due to the lower probability of intercept/detection (LPI/LPD) and high data transfer rates that can be achieved via directional networking.

SUMMARY

A method for directional mobile ad-hoc communication may include: transmitting a join message from a first node to a second node; receiving an accept message from the second node including a TDMA frame slot reassignment correlating to an available TDMA frame slot in a TDMA frame associated with the second node; reassigning a TDMA frame slot for the first node in the TDMA frame associated with the first node according to the frame slot reassignment received from the second node; and assigning a TDMA frame slot for the second node in the TDMA frame of the first node.

A method for directional mobile ad-hoc communication may include, but is not limited to: executing a discovery protocol to configure a directional mobile ad-hoc communication network between a first node and as second node; transmitting a bandwidth reservation request message from the first node to the second node; receiving a bandwidth reservation response message from the second node; and enabling a relay node.

BRIEF DESCRIPTION OF THE DRAWINGS

The disclosure will become more fully understood from the following detailed description, taken in conjunction with the accompanying drawings, wherein like reference numerals refer to like elements, in which Figure Reference No:

FIG 2. illustrates a D-MANET system;
FIG 4A. illustrates a cog Joiner transmitting a Join message to a cog Joinee;
FIG 4B. illustrates a TDMA frame structure for a Joiner and a Joinee;
FIG 5. illustrates an exemplary structure of a JOIN message;
FIG 6. illustrates an exemplary structure of an ACCEPT message;
FIGS. 17, 18, 19, 20, 21 illustrate exemplary gateway bootstrap messages;
FIGS. 24, 25, 26, 27, 28, 29, 30, 31, 32, 33, 34, 35, 36 and 37 illustrate a D-MAN ET;
FIGS. 41, 42, 43 and 44 illustrate directional data pipe frame structures;
FIGS. 51,52, 53, 54, 55, 56, 57, 58, 59, and 60 illustrate methods for directional mobile ad-hoc communication.

DETAILED DESCRIPTION

Figure 1:
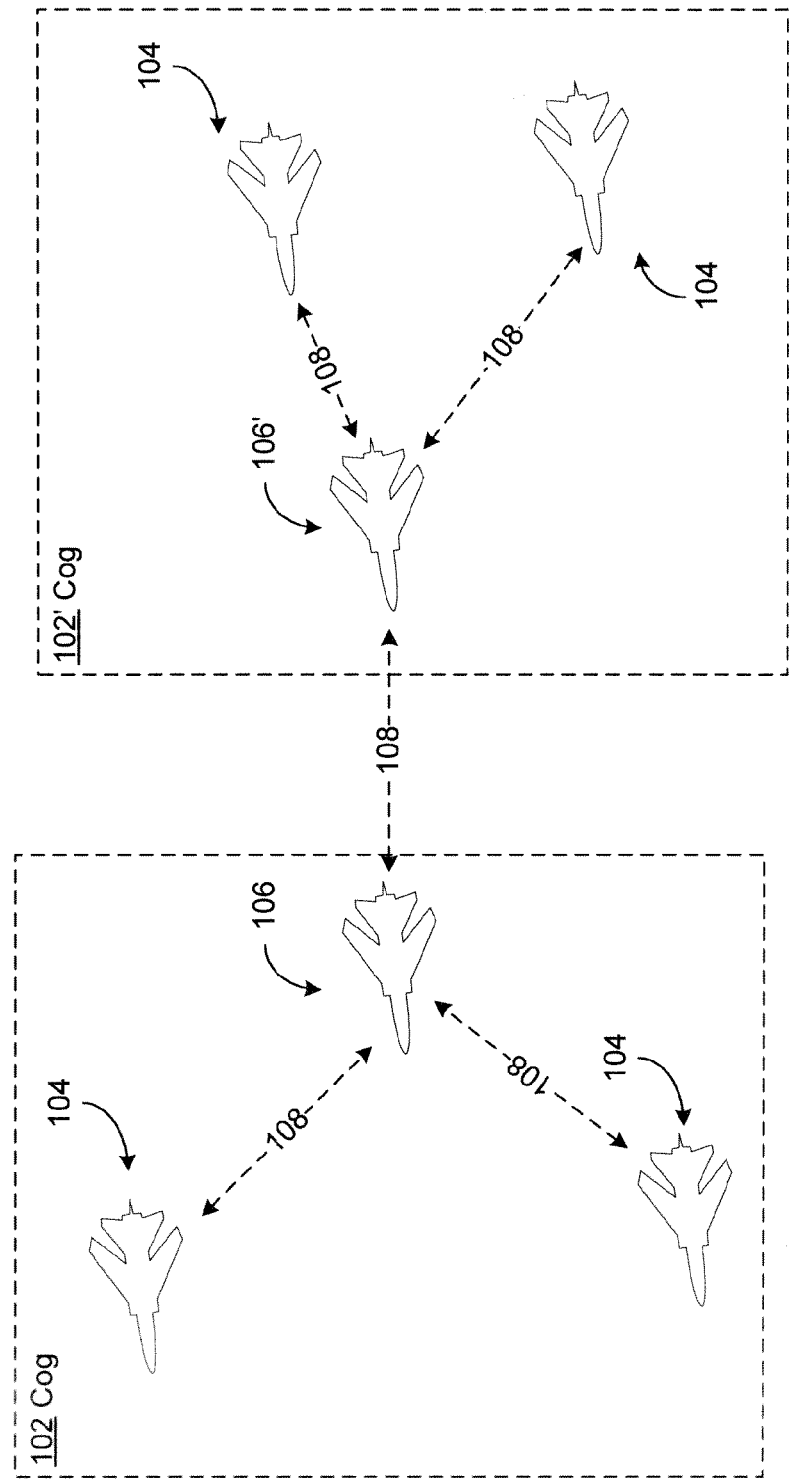
FIG 1. illustrates a directional mobile ad-hoc network (D-MANET)

Referring to FIG. 1 a directional mobile ad-hoc network (D-MANET) 100 is depicted. In the D-MANET 100, directional networking infrastructures (e.g. "cogs" 102) may be established to provide localized control of leaf nodes 104 in the same proximity. A gateway node (i.e. "CMs" 106) may be a root node designated to provide management over the leaf nodes 104 in a cog 102 and perform as an ambassador node to neighboring cogs 102'.

CMs 106 may communicate with leaf nodes 104 in the cog and other neighboring gateway nodes 106' via bootstrap messages that occur at the front end of a frame structure. The number of bootstrap slots may be minimized to minimize the overhead associated with management functions. Spatial/spectral reuse may be employed to allow all gateway nodes 106 to communicate within the bootstrap slots of a single frame. Some of the management functions of the gateway nodes 106 may be to select appropriate reservation relay nodes 104 within its own cog 102 and forward the appropriate reservation information. Once reservations are setup the individual nodes 104 may exchange information within dynamic on-the-fly bootstrap slots to maintain directional links.

A gateway node 106 may have multiple interfaces to other gateway nodes 106'. All nodes 104 in a cog 102 may have connectivity to their gateway node 106 via a discovery channel 108, and the gateway node 106 may know the position, velocity information for each node 104 in its cog 102 allowing it to transmit messages from itself or those received from a gateway node 106' of another cog 102'.

Referring to FIG. 2, a D-MANET system 108 is illustrated. Each leaf node 104 and gateway node 106 may employ the D-MANET system 108 to monitor its own Euler angle and position and those of its associated cog 102 members. The directional D-MANET system 108 may include a directional antenna controller 110. The directional antenna controller 110 may include a processing unit 112 and a node position database 114. For a gateway node 106, the node position database 114 may maintain data regarding the position of all associated leaf nodes 104 as well as other gateway nodes 106'. For a leaf node 104, the node position database 114 may maintain data regarding the position of its gateway node 106. The D-MANET system 108 may further include a time division multiple access (TDMA) schedule 116 of for scheduling packet transmission between nodes 104 and gateway nodes 106/106', as will be discussed in further detail below.

Each leaf node 104 and/or gateway node 106 may transmit data using a directional antenna 118. The direction in which data is transmitted by the directional antenna 118 may be determined by the directional antennal controller 110. The processing unit may retrieve position data for the leaf node 104/gateway node 106 and position data for an intended target receiver from the node position database 114 and compute a direction in which the data should be transmitted. The directional antenna controller 110 may then cause the directional antenna 118 to transmit the data in the intended direction.

Referring again to FIG. 1, the discovery channel 108 may be responsible for discovering neighboring nodes 104, synchronizing time, negotiating slot times for transmissions, and selection of gateway nodes 106.

The discovery channel may utilize a protocol incorporating both omni-directional and switched directional antennas. The protocol may allow for discovery via the Omni-directional antenna followed by higher speed data communication using directional antennas.

Given a universe of independent radio nodes listening aperiodically using omni antennas, nodes 104 may be able to join one another using directed antennas. These directed antennas may then form dedicated point-to-point signaling channels. Once joined, the nodes form a network that periodically exchange position information using only directed antennas as shown in FIG. 1.

A node 104 may listen in omni mode unless a packet has been scheduled for transmission at which point a particular antenna will be selected and the message sent directionally.

Figure 3A:
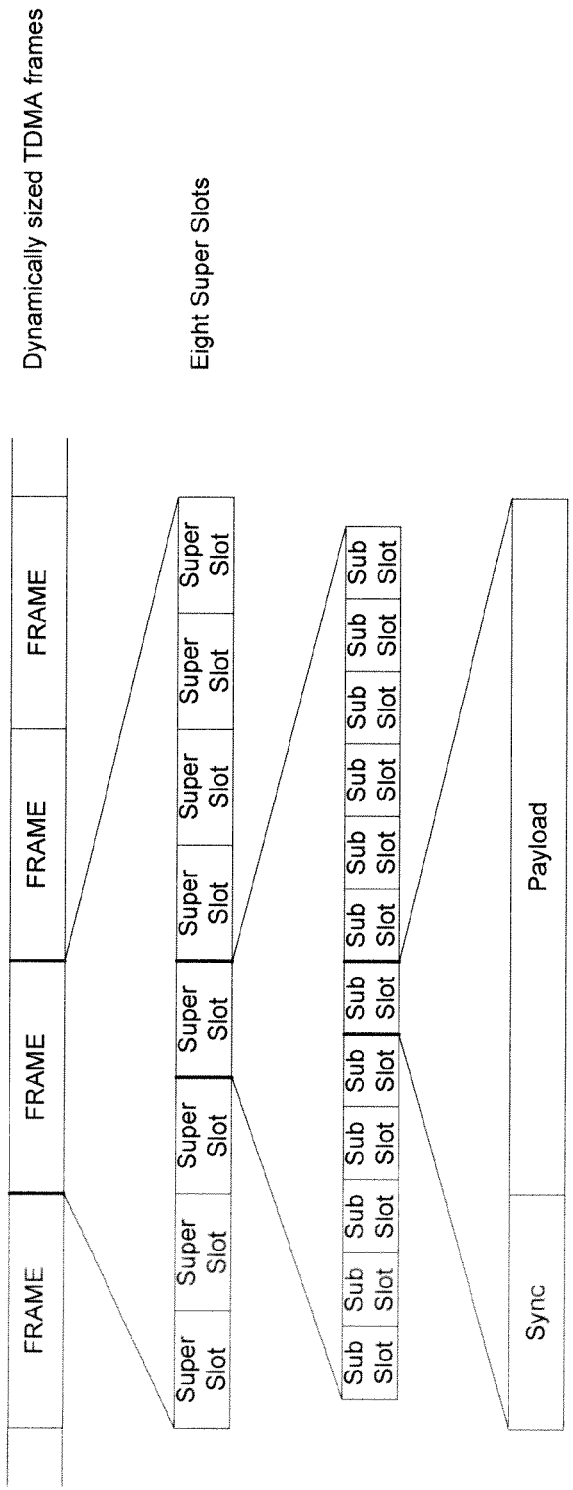
FIG 3A. illustrates a TDMA frame hierarchy.
Figure 3B:
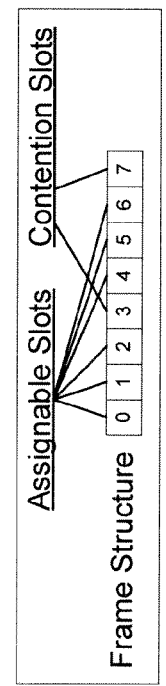
FIG 3B. illustrates a TDMA frame sub-level.

As referenced above, packet transmission between nodes 104 and gateway nodes 106/106' may be governed by a TDMA schedule 116. Referring to FIG. 3A, a frame hierarchy for TDMA structure for scheduling packet transmission between nodes 104 and gateway nodes 106/106' is illustrated. The channel may be made of a sequence of equal sized TDMA frames. Each frame may be composed of eight super slots. Referring to FIG. 3B, six super slots may be assignable to leaf nodes 104 and/or gateway nodes 106. Assignable slots may be those which nodes may own and transmit and receive to other nodes. Two of the super slots may be reserved as contention slots. Contention slots may be predefined slots which may be used for cogs to merge. Referring again to FIG. 3A, each super slot may be further subdivided into 12 sub slots capable of supporting a single transmission of up to 130 bytes.

Following are a description of a series of flowcharts depicting exemplary implementations. For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

FIG. 51 illustrates an operational flow 5100 representing example operations related to directional mobile ad-hoc communications. In FIG. 51 and in following figures that include various examples of operational flows, discussion and explanation may be provided with respect to the above-described examples of FIG. 51, and/or with respect to other examples and contexts. However, it should be understood that the operational flows may be executed in a number of other environments and contexts, and/or in modified versions of FIG. 51. Also, although the various operational flows are presented in the sequence(s) illustrated, it should be understood that the various operations may be performed in other orders than those that are illustrated, or may be performed concurrently.

Operation 5110 depicts transmitting a join message from a first node to a second node. For example, as shown in FIG. 4A, a Joiner (e.g. gateway node 4) of a first cog may transmit a JOIN message to Joinee (e.g. gateway node 1) of a second cog. Referring to FIG. 4B, the respective TDMA frames structures for Joinee gateway node 1 and Joiner gateway node 4 are shown. A Joiner may join a cog by sending a JOIN message in its TDMA frame slot (e.g. slot 0 for gateway node 4). Referring to FIG. 5, an exemplary structure of a JOIN message is illustrated. A JOIN message may contain a repeated SYNC pattern so that a receiver may know how to offset future communication with the joiner. The message may also contain repeated node identification and position information associated with the joining node.

Operation 5120 depicts receiving an accept message from the second node including a TDMA frame slot reassignment correlating to an available TDMA frame slot in a TDMA frame associated with the second node. Referring again to FIG. 4B, a Joinee (e.g. gateway node 1) may receive a JOIN message in an unassigned TDMA frame (e.g. slot 2 for gateway node 1). Based on the slot number obtained within the JOIN message, the Joinee (e.g. gateway node 1) may be able to ascertain that the next contention slot for the Joiner (e.g. gateway node 4) may be in its slot 3 (i.e. slot 5 of the Joiner). The Joinee may be also able to determine the amount of offset between the two frame structures. Using the bitmap provided by the Joiner, the Joinee may assign the Joiner to slot 2 in its TDMA frame. This information may be sent back to the Joiner in an ACCEPT message. Referring to FIG. 6, an exemplary structure of an Accept message is illustrated. The ACCEPT message marks the acceptance into the network of the Joiner. The ACCEPT message may include timing and slot reconfiguration requirements for the joining node or network. The ACCEPT message may reflect the assignment of the Joiner to slot 2 in the TDMA frame structure by the Joinee.

Operation 5130 depicts reassigning a TDMA frame slot for the first node in the TDMA frame associated with the first node according to the frame slot reassignment received from the second node. Referring to FIG. 4B, upon receipt of the Accept message, a Joiner (e.g. gateway node 4) may reassign its TDMA frame slot in its own TDMA frame according to the frame slot assignment contained in the ACCEPT message provided by the Joinee. For example, the Joiner may have its TDMA frame slot reassigned to slot 2 from slot 0 as shown in frame 2 of FIG. 4B.

Operation 5140 depicts assigning a TDMA frame slot for the second node in the TDMA frame of the first node. Referring to FIG. 4B, upon reassignment of the TDMA frame slot associated with a Joiner in the Joiner's TDMA frame, the Joiner may assign a TDMA frame slot (e.g. slot 0) for the Joinee within its TDMA frame that corresponds to the TDMA frame slot of the Joinee in its TDMA frame as provided in the ACCEPT message.

Figures 14, 15:
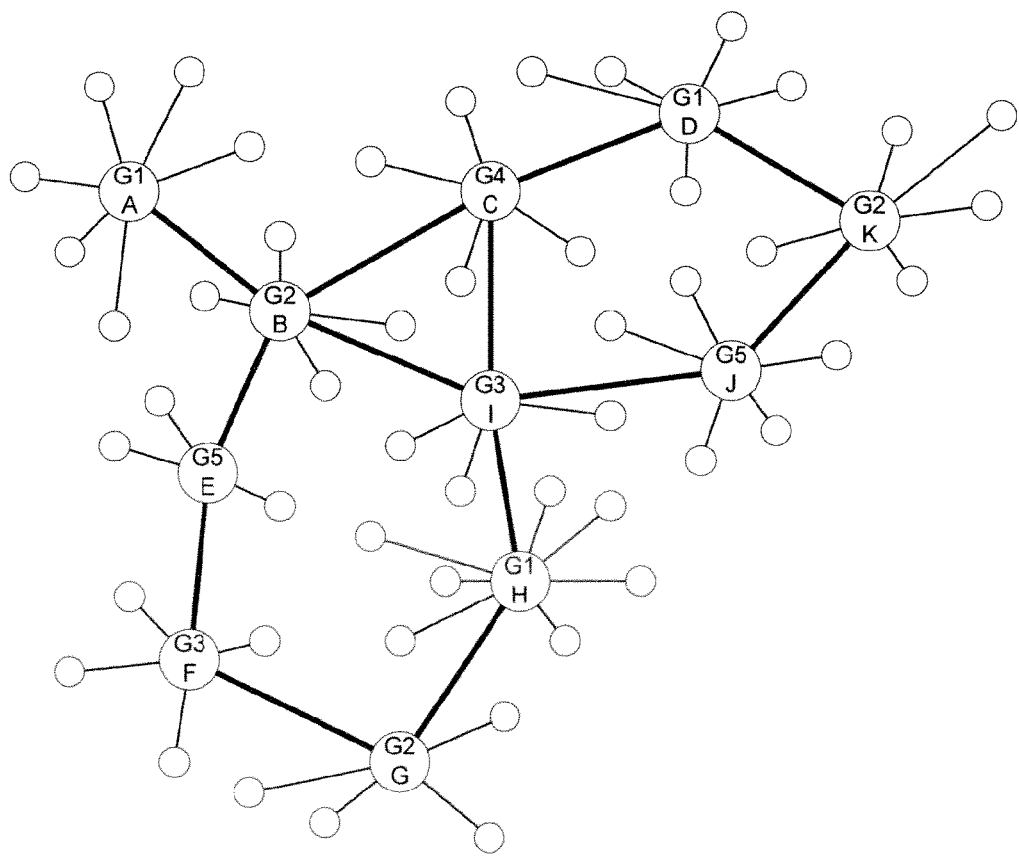
FIG 14. illustrates an exemplary structure of an UPDATE message.
FIG 15. illustrates a virtual infrastructure network represented by inter-cog connections

Operation 5150 depicts establishing a network infrastructure for inter-group communications. Referring to FIG. 15, a gateway node infrastructure may be formed as a result of the discovery channel protocols described above and may be used to setup reservations, maintain connectivity, and derive routes via gateway node bootstraps. In FIG. 15, the larger lettered nodes may be gateway nodes. The discovery protocol described as above may assign a gateway node ID (GID) to each gateway node. The GID may be assigned using a heuristic to solve a non-polynomial hard map coloring problem such that the net result may be that no two gateway nodes with the same GID may be within 2-hops of each other. Further details regarding establishing the network-infrastructure will be provided below.

Figure 16:
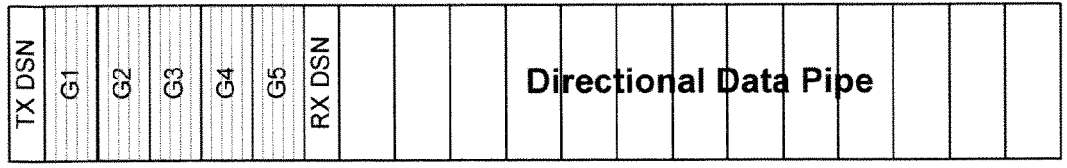
FIG. 16 illustrates a directional data pipe frame structure.

Operation 5160 depicts establishing a bandwidth reservation between the first node and the second node. As gateway nodes setup a reservation path during the discovery protocol, they may allocate their bandwidth or that of other subordinate nodes to carry directional communications. The gateway nodes may act as a reservation arbiter for all nodes in its cog. Gateway nodes may be aware of all reservations and all bandwidth allocations in their cog. Each gateway node may have a predefined bootstrap slot in their frame structure as shown in FIG. 16. Further details regarding bandwidth reservation will be provided below.

FIG. 52 illustrates alternative embodiments of the example operational flow 5100 of FIG. 51. FIG. 52 illustrates example embodiments where the operational flow 5100 may include at least one additional operation. Additional operations may include an operation 5202, and/or an operation 5204, and/or an operation 5206.

Operation 5202 depicts receiving a TDMA frame offset from the second node. As previously described, the ACCEPT message may include timing and slot reconfiguration requirements for the joining node or network. As shown in FIG. 4B, the ACCEPT message may include an offset (e.g. −2 TDMA frame slots) by which the TDMA frame of the Joiner must be shifted to sync with the TDMA frame of the Joinee.

Operation 5204 depicts syncing the TDMA frame associated with the first node according to the TDMA frame offset. As shown FIG. 4B, one or more TDMA frame slots in the Joiner's TDMA frame may be skipped during a particular frame (e.g. frame 3) in order to sync the TDMA frames of the Joiner and the Joinee.

FIG. 53 illustrates alternative embodiments of the example operational flow 5100 of FIG. 51. FIG. 53 illustrates example embodiments where the operational flow 5100 may include at least one additional operation. Additional operations may include an operation 5302.

Figure 7:
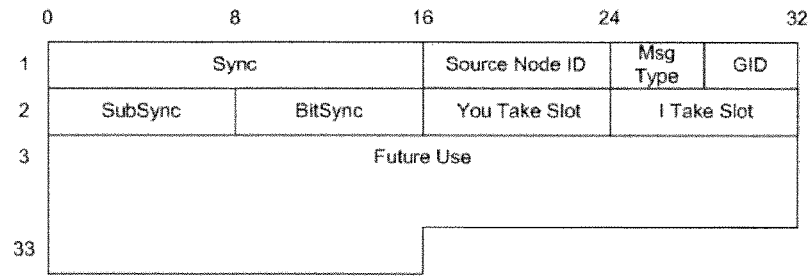
FIG 7. illustrates an exemplary structure of a RECONFIGURE message.
Figure 8A:
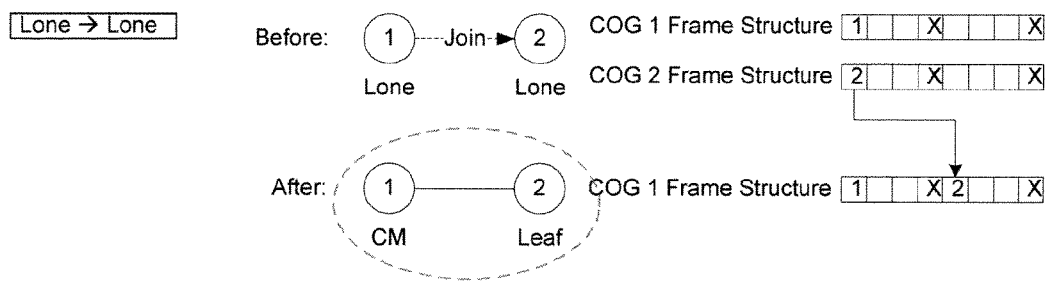
FIGS. 8A, 8B, 9A, 9B, 10A, 10B, 11A, 12A and 12B illustrate Joiner/Joinee scenarios.
Figure 8B:
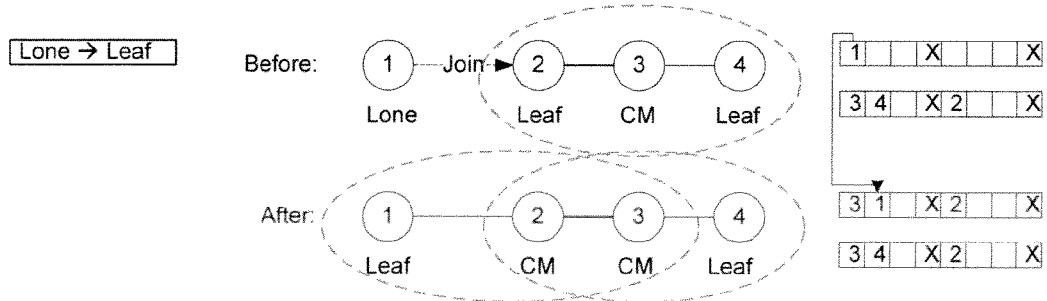
Figure 9A:
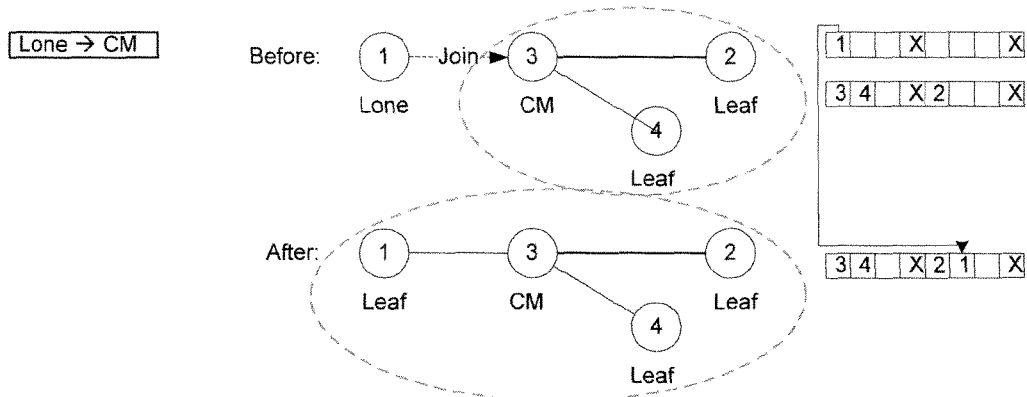
Figure 9B:
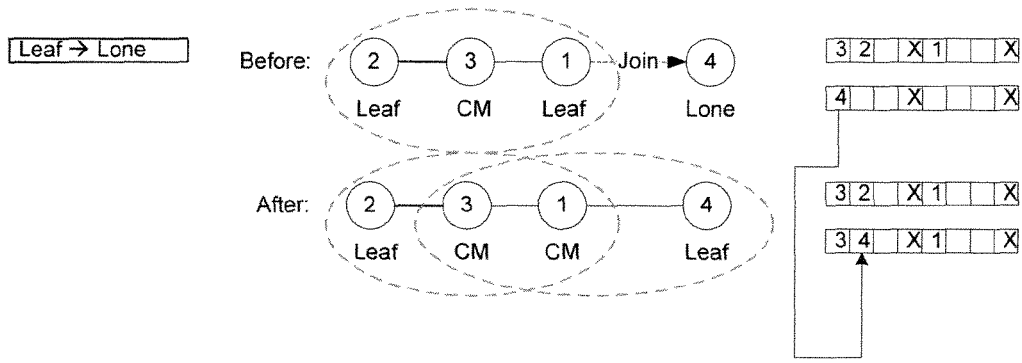
Figure 10A:
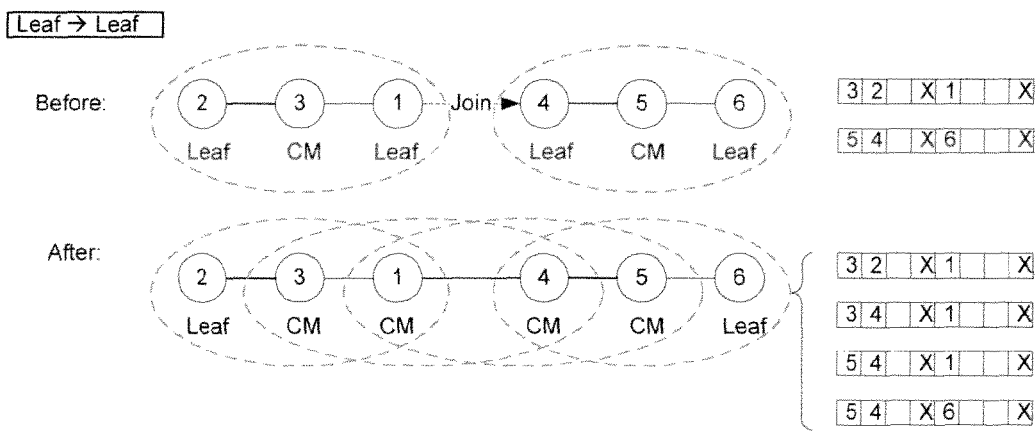
Figure 10B:
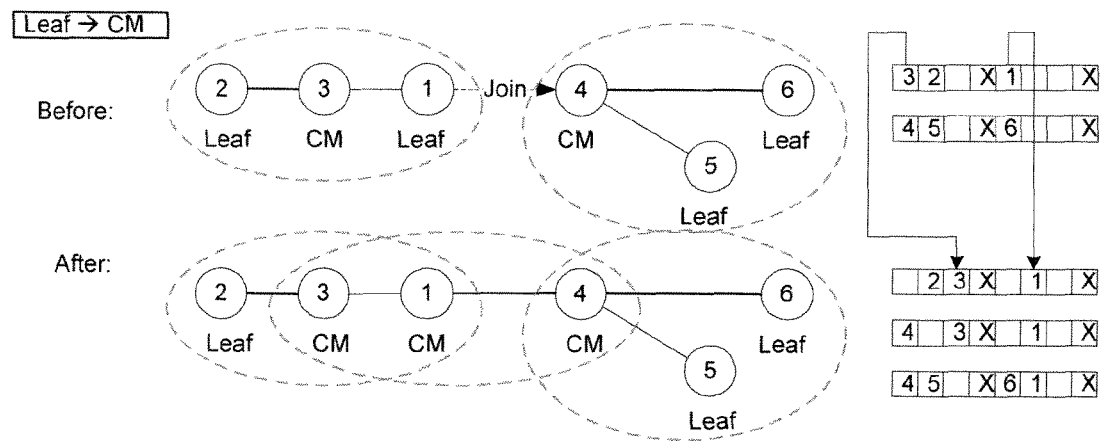
Figure 11A:
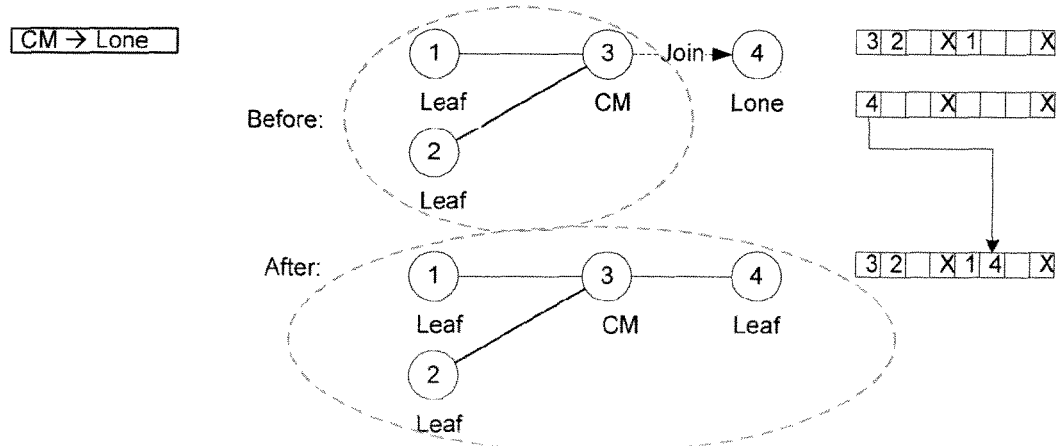
Figure 12A:
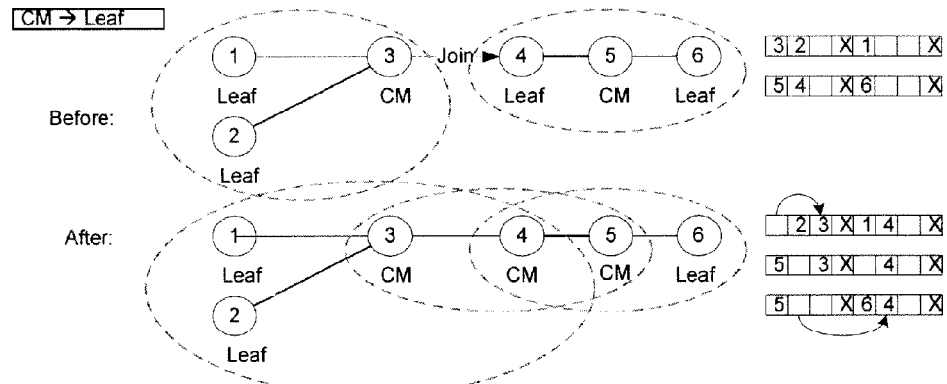
Figure 12B:
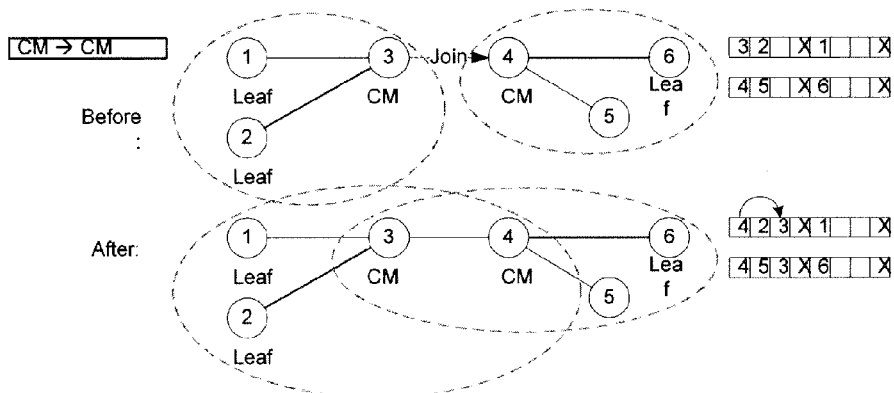

Operation 5302 depicts transmitting a reconfigure message including an TDMA frame slot reassignment for a third node from the first node to the third node. Referring to FIGS. 4A and 4B, the Joiner may transmit an update message to associated nodes (e.g. nodes 5 and 6) containing information about the reassignment of the Joiner to the TDMA frame slot (e.g. slot 2) as determined by the Joinee. Further, the Joiner may also provide information regarding any timing adjustment that needs to take place to account for the reassignment (as referenced above with respect to Operations 3102 and 3004). Referring to FIG. 7, an exemplary structure of a RECONFIGURE message is illustrated. The RECONFIGURE message may be used to tell another node that a modification of the slot structure, or cog wheel, may be required. The message may include the slot structure along with the time at which the slot structure will begin.

Numerous protocols for assignment, reassignment and offsetting of the TDMA frame slots for various configurations of Joiners, Joinees and any existing cog formations may be required. Referring to FIGS. 8A-12B, various Joiner/Joinee scenarios are illustrated with the "before" and "after" cog formations and the resulting TDMA frame structures associated therewith.

Figure 13:
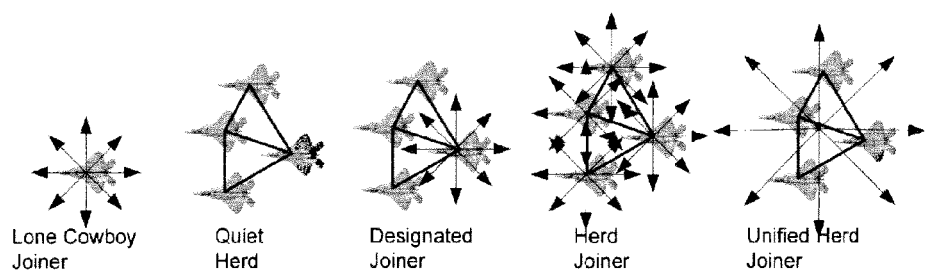
FIG 13. various Joiner modes.

Each node may also maintain a joining mode for discovery. This mode can be controlled either externally or internally. When externally controlled, the nodes joining mode may be set to enabled or disabled from an upper layer system. This can be based on some algorithm or LPI/LPD metric. When internally controlled, the node can make its own decision based on whether it may be a lone node or a full cog. Referring to FIG. 13, various joining modes are depicted.

A lone cowboy joiner may be a node who may be not yet part of a network. It may send join messages on its directed antenna aperiodically. A quiet herd may be a network in which all nodes have disabled their join message system thereby precluding other nodes/cogs from joining. A designated joiner may be a node within a network that has enabled its join message system while all other nodes within the network have disabled their join message system. A herd joiner may be a network in which all nodes have the join message system enabled. A unified herd joiner implements a convex hull algorithm by which only border nodes implement the join message system.

FIG. 54 illustrates alternative embodiments of the example operational flow 5100 of FIG. 51. FIG. 54 illustrates example embodiments where the operational flow 5100 may include at least one additional operation. Additional operations may include an operation 5402.

Operation 5402 depicts transmitting an update message including node position and velocity data during a reassigned TDMA frame slot for the first node. Following configuration of the TDMA frame for a Joiner, the Joiner may begin transmitting UPDATE messages including position and velocity data associated with the Joiner to the Joinee as well as other neighbor nodes. This data may serve to enable the directional communication functionality as described above with respect to FIG. 2. Referring to FIG. 14, an exemplary structure of an UPDATE message is illustrated.

FIG. 55 illustrates alternative embodiments of the example operational flow 5100 of FIG. 51. FIG. 55 illustrates example embodiments where the operational flow 5100 may include at least one additional operation. Additional operations may include an operation 5502.

Operation 5502 depicts receiving data regarding a position of the second node. Following configuration of the TDMA frame for a Joiner, the Joiner may also begin receiving UPDATE messages including position and velocity data associated with the Joinee as well as the other neighbor nodes.

FIG. 56 illustrates alternative embodiments of the example operational flow 5100 of FIG. 51. FIG. 56 illustrates example embodiments where the operational flow 5100 may include at least one additional operation. Additional operations may include an operation 5602.

Operation 5602 depicts transmitting data via a directional antenna during a reassigned TDMA frame slot for the first node in the TDMA frame associated with the first node according to the position of the second node. As described above with respect to FIG. 2, the D-MANET system 108 may transmit data to neighboring nodes via a directional antenna based on position and velocity data received from those nodes. Following the receipt of an UPDATE message from the Joinee or a neighbor node, the Joiner may transmit data to the Joinee or neighbor node during the TDMA frame slot to which is was assigned by the Joinee during the joining process.

Following network discovery operations (e.g. those depicted in FIGS. 51-56) the D-MANET 100 may perform reservation setup, maintain connectivity, and derive routes. Reservation setup and network routing protocols may utilize the information provided by the discovery protocol to allow further reaching multi-hop data communications. This may be accomplished by utilizing a higher bandwidth TDMA frame structure shown in FIG. 16 with the gateway ID (GID) bootstraps for inter-gateway communications and intra-cog communications as needed. The inter-gateway communications may be used to request and setup multi-hop data communications.

FIG. 57 illustrates an operational flow 5700 representing example operations related to establishing a bandwidth reservation between a first node and a second node. FIG. 57 illustrates example embodiments where the operational flow 5700 may include at least one operation. Operations may include an operation 5710, and/or an operation 5720, and/or an operation 5730, and/or an operation 5740, and/or an operation 5750.

Similar to operations 5110-5140 above, Operation 5710 depicts executing a discovery protocol to configure a directional mobile ad-hoc communication network between a first node and as second node.

As referenced above with respect to operation 5150, as gateway nodes setup a reservation path, they may allocate their bandwidth or that of other subordinate nodes to carry directional communications. The gateway nodes may act as a reservation arbiter for all nodes in its cog. Gateway nodes may be aware of all reservations and all bandwidth allocations in their cog. Each gateway node may have a predefined bootstrap slot in their frame structure as shown in FIG. 16.

A gateway node's bootstrap slot may be partitioned into sub-slots to allow multiple directional transmissions to different nodes in the same bootstrap time slot. A transmit directional slot negotiation (TX DSN) slot may occur at the beginning of the frame and may be used to indicate available slot times a node can receive data from a particular node. A receive directional slot negotiation (RX DSN) slot may occur at the end of the frame and may be used to confirm the subset of slots that will be used for a transmission. The bootstraps and the directional data frame are directional transmissions.

Figure 17:
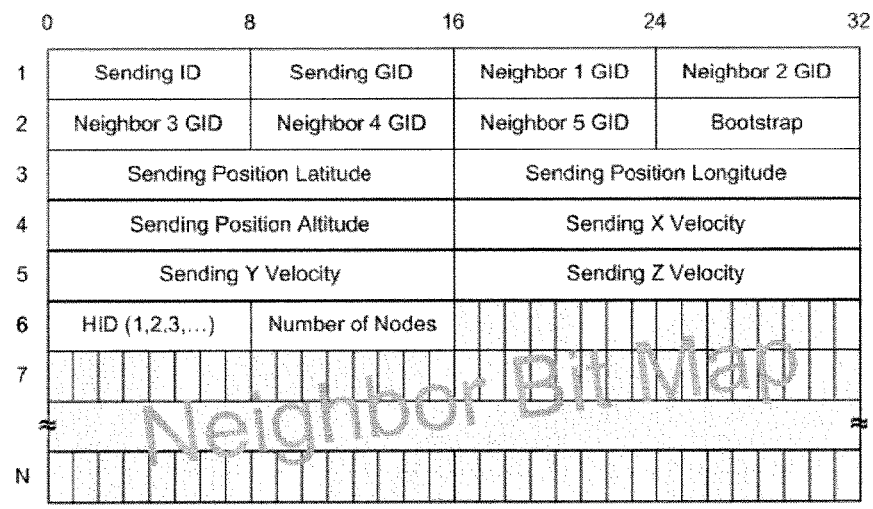

Gateway nodes may transmit a bootstrap message once a frame. While there may be several different types of bootstrap messages, every bootstrap message may contain a generic bootstrap message format. A message-type field in the bootstrap message may indicate a message type and can be one of the following different types:

1) Generic Bootstrap—This message type may be a subset of the other message types and simply may contain the neighbor information and has no reservation information embedded. Referring to FIG. 17 an, an exemplary structure of a generic gateway bootstrap message is illustrated.

Figure 18:
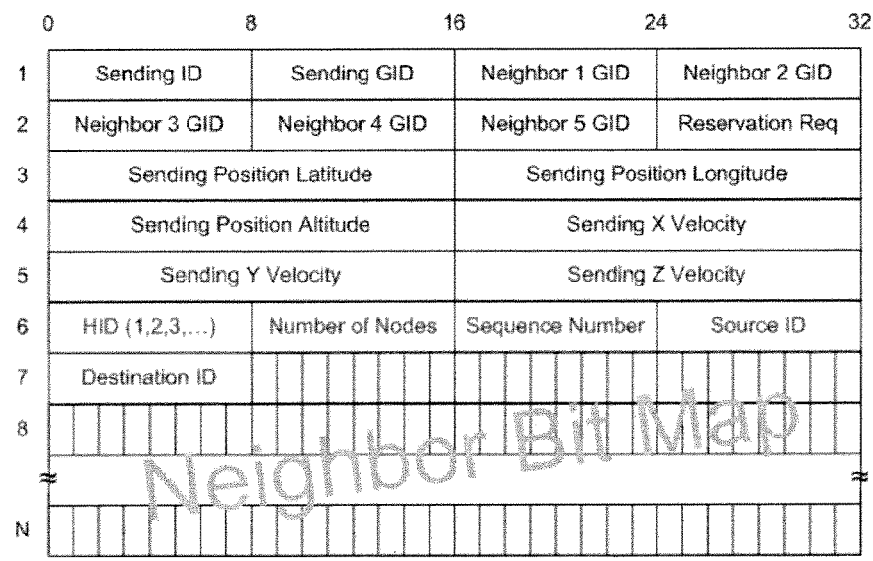

2) Reservation Request—This message type may be sent when a node wishes to setup a reservation between itself and a destination node. Referring to FIG. 18, an exemplary structure of a reservation request gateway bootstrap message is illustrated. This message type may be the originating message for reservations. This message carries the Source node ID, Destination node ID, and Position Info of the Source node ID.

3) Reservation Response—This message type may be sent in response to a reservation request by the destination node. Referring to FIG. 19, an exemplary structure of a reservation response gateway bootstrap message is illustrated. This message carries the Source node ID, Destination node ID, and Position Info of the Source and Destination node ID.

4) Relay Reservation Response—This message type may be sent by an intermediate node between the Source and Destination node when the Euclidean distance between the Source and Destination may be greater than the data communications range. Referring to FIG. 20, an exemplary structure of a relay reservation response gateway bootstrap message is illustrated. The intermediate (relay) node will determine how well it can communicate with the Source and Destination nodes and proactively transmit this message to each. This message carries the Source node ID, Destination node ID, Relay node ID, and Position Info of the Source, Destination, and Relay node ID.

5) Reservation Relay Expansion—This message type may be similar to the Reservation Request but may be requesting an expansion (adding additional relay node) to an existing reservation. Referring to FIG. 21, an exemplary structure of a reservation expansion gateway bootstrap message is illustrated. This message type may be always the originating message for reservations. This message may be further described in the message format section.

Operation 5720 depicts establishing a network infrastructure for inter-group communications. Referring again to FIG. 15, a gateway node infrastructure may be formed as a result of the discovery channel protocols described above and may be used to setup reservations, maintain connectivity, and derive routes via gateway node bootstraps. In FIG. 15, the larger lettered nodes may be gateway nodes. The discovery protocol described as above may assign a gateway node ID (GID) to each gateway node. The GID may be assigned using a heuristic to solve a non-polynomial hard map coloring problem such that the net result may be that no two gateway nodes with the same GID may be within 2-hops of each other. Each gateway node represents a cogwheel consisting of itself and all connected nodes are shown as smaller gray nodes. Moreover, each gateway node may have multiple adjacent gateway nodes to neighboring cogwheels.

The gateway nodes may form a virtual infrastructure network represented by the inter-cog connections depicted in FIG. 15. Each gateway node determines its own gateway node identification (GID) based on information it exchanges with adjacent gateway nodes. When a gateway node joins a network it transmits its own GID and any neighboring gateway nodes that have GIDs (as shown in the JOIN message format of FIG. 5). Furthermore, the new gateway node will receive GID of all neighboring gateway nodes (as shown in the ACCEPT message format of FIG. 6). The new gateway node may then select a GID that may be different then any of the GIDs it has received from the gateway node GID reports.

Gateway nodes may need to exchange information with each other to determine routing information and perform call setup. As such, a small portion of the TDMA frame may be carved out for a bootstrap for this sort of information.

Figures 22, 23:
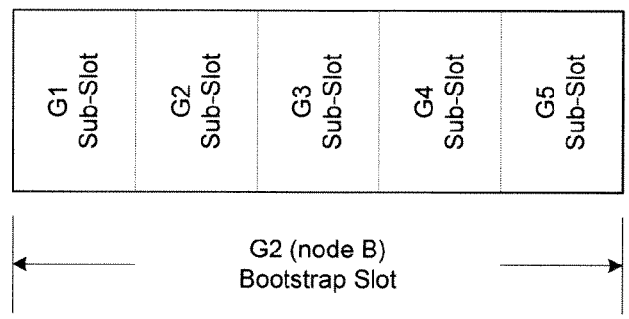
FIG. 22 illustrates an exemplary bootstrap slot configuration.
FIG. 23 illustrates a spreadsheet showing the bootstrap slots for the gateway nodes of FIGS. 15.

Each gateway node may transmit in a bootstrap slot consisting of multiple sub-slots. There may be as many sub-slots as there may be different GIDs. This allows each gateway node to communicate with every other neighboring gateway node, provided it has enough antennas. FIG. 22 depicts a bootstrap slot and associated sub-slots for node B having a GID of G2. The first sub-slot may be for communication with all G1 gateway nodes. In the example of FIG. 15, node B would be using this sub-slot to communicate to node A which may be a G1 node. The next sub-slot may be used for communicating with any G2 nodes in its own cog. The next sub-slot would be for G3 nodes and would correspond to node I. The next sub-slot would be for G4 nodes and would be node C. And finally the last sub-slot of the G2 bootstrap slot may be to communicate to G5 nodes and would be to node E.

FIG. 23 illustrates a spreadsheet showing the bootstrap slots for the gateway nodes of FIG. 15. In the first gateway node column for G1, node B transmits to gateway nodes E (G3), A (G4), and C (G5). The second column for G1 shows node G transmitting to gateway nodes F (G2) and H (G3). Subsequent columns show similar gateway bootstrap transmissions. These first two columns show nodes B and G transmitting their bootstraps simultaneously to their respective neighboring gateway nodes. Therefore, these two nodes must be more than 2-hops away from each other as shown in FIG. 15.

Figure 24:
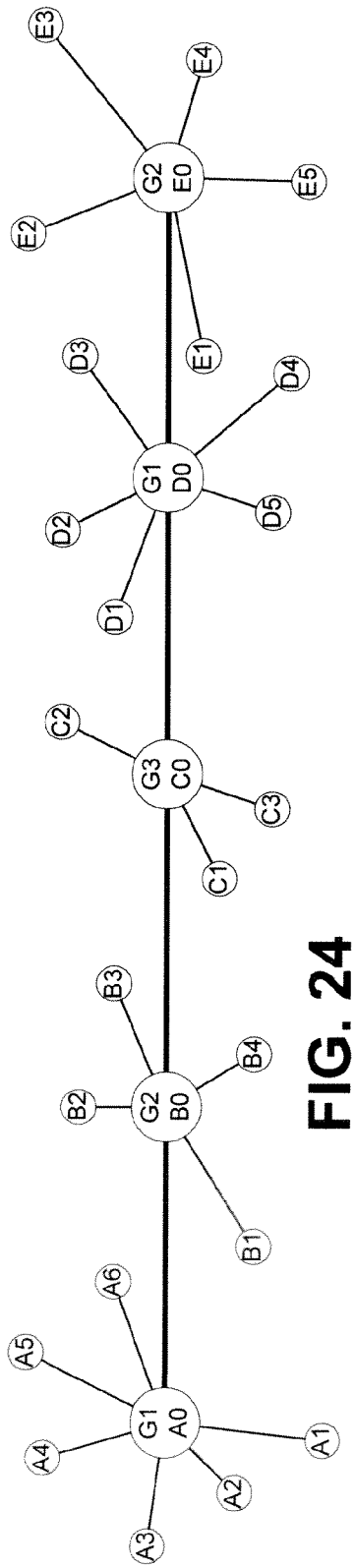

Referring to FIG. 24, an example network topology is illustrated that will be used to explain reservation setup. Larger nodes are gateway nodes with their GID shown in the upper portion of the circle and their node ID is shown in the lower portion. All others nodes are ordinary nodes that belong to the cog associated with the connected gateway node. The intra-gateway node line indicates the gateway node infrastructure.

Figure 25:
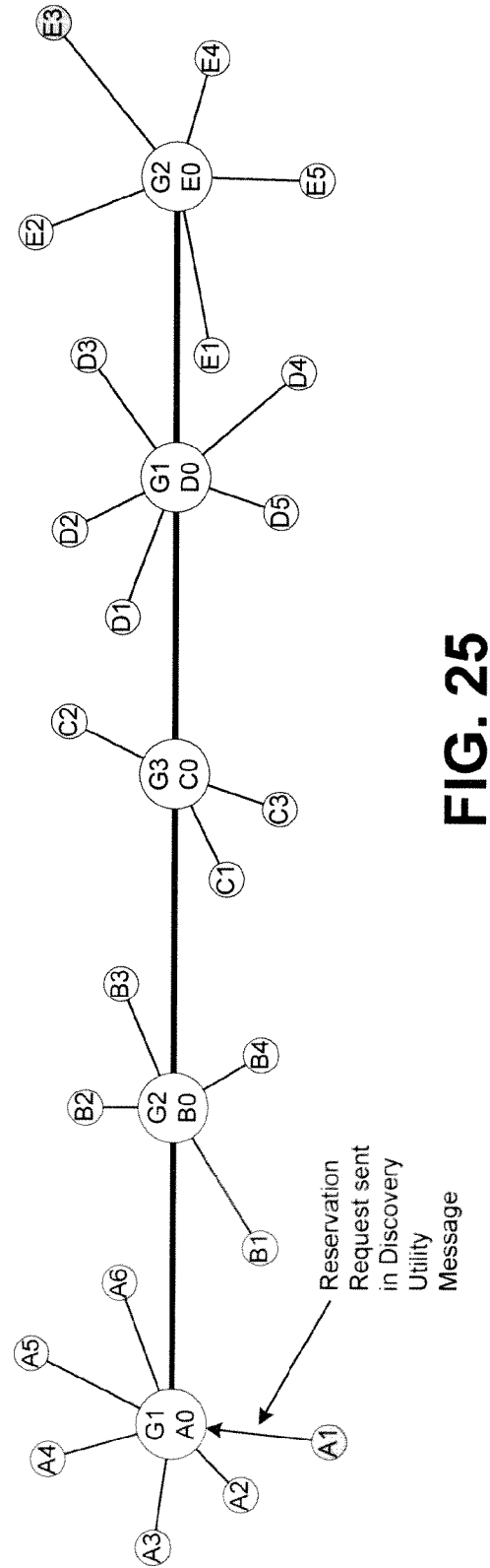

Operation 5740 depicts transmitting a bandwidth reservation request message from the first node to the second node. Referring to FIG. 25, a node A1 may make a Reservation Request for a specific bandwidth to a destination node E2. The reservation may be made by transmitting a reservation request utility message.

Figure 26:
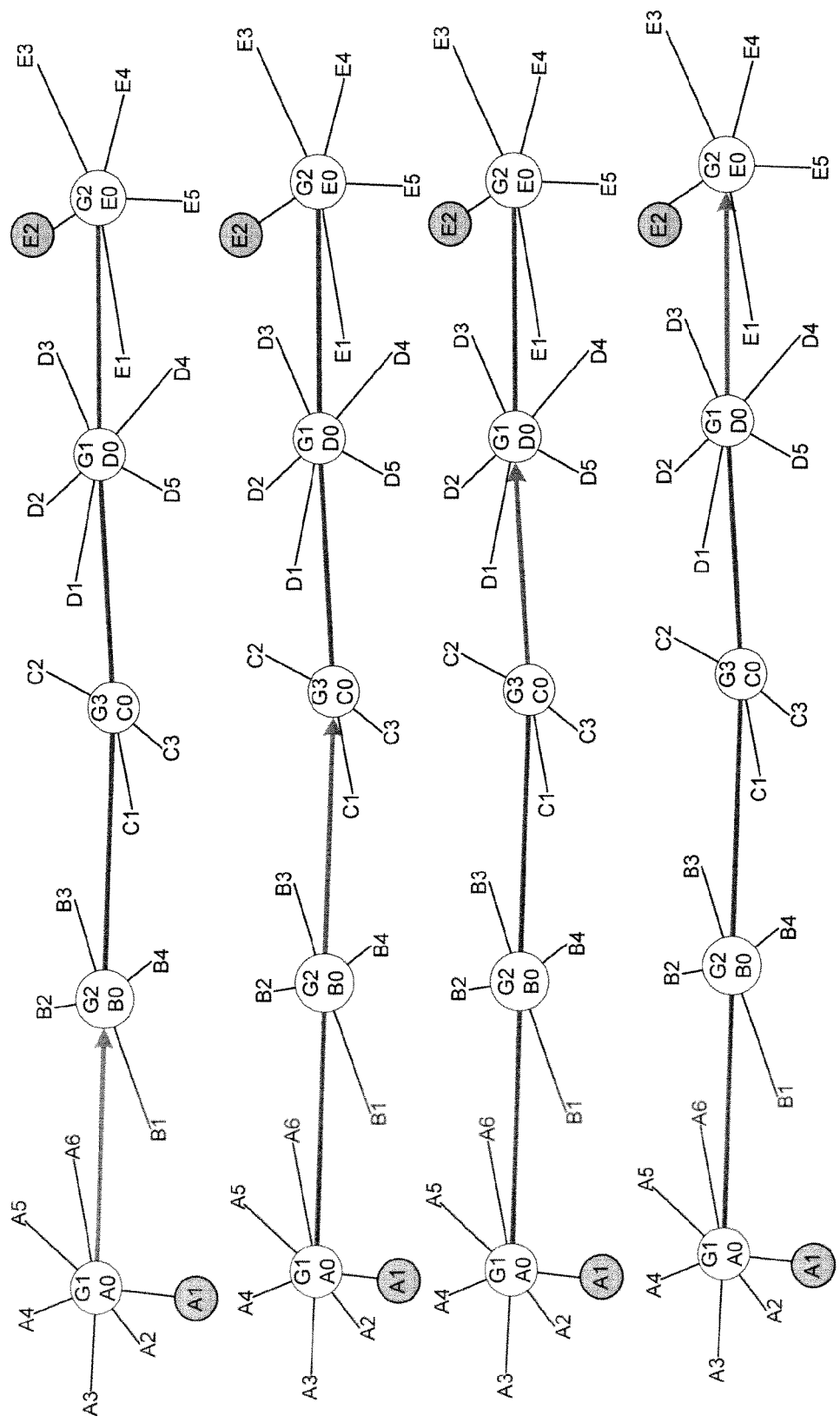

Referring to FIG. 26, the Reservation Request may be forwarded from gateway node A0 to gateway node E0 through the gateway node infrastructure. Referring to FIG. 27, once received at the destination gateway node (e.g. gateway node E0), the Reservation Request may be transmitted to the destination node via (e.g. node E2) via a discovery utility message.

Figure 29:
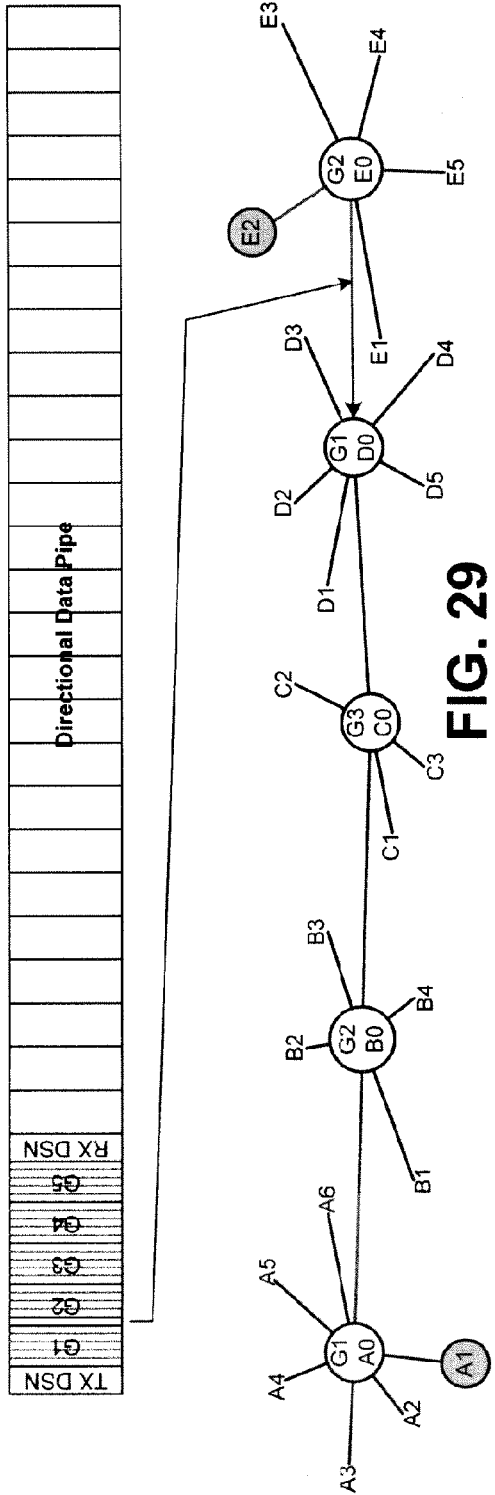

Operation 5750 depicts receiving a bandwidth reservation response message from the second node. Referring to FIG. 28, if the Reservation Request is acceptable then the destination node may respond with a Reservation Response message to its gateway node in a Discovery Utility message. Referring to FIG. 29, gateway node E0 may forward the Reservation Response back to gateway node D0 during the G2 bootstrap slots. During the forwarding, node D0 receives the Reservation Response from E0 during the G2 bootstrap slot.

Operation 5760 depicts enabling a relay node. Referring again to FIG. 29, node D0 may select an appropriate relay node from its cog. For example node D0 may select node D2 to be the relay node back to the source node A1. Gateway nodes may act as the arbiter for bandwidth allocation within their cog. By knowing the amount of bandwidth each node in a cog is currently using, gateway nodes may effectively select suitable relay nodes that are capable of acting as relays between distributed nodes of various cogs within the D-MANET. It should be noted that gateway nodes may know each node's bandwidth but not be aware of consumed slots. Therefore, a relay node may be selected that may not meet a requested bandwidth allocation. The actual slot allocations may be negotiated and agreed upon between the source, destination, and relay nodes as will be described below.

FIG. 58 illustrates alternative embodiments of the example operational flow 5700 of FIG. 57. FIG. 58 illustrates example embodiments where the operational flow 5700 may include at least one additional operation. Additional operations may include an operation 5802.

Figure 30:
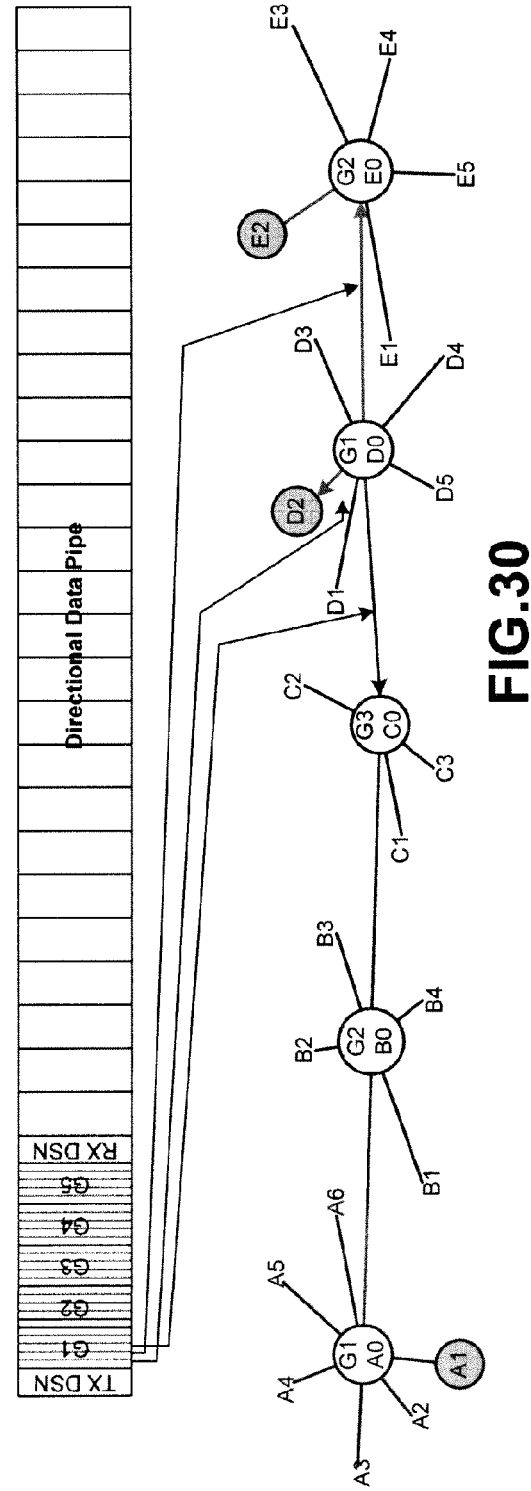

Operation 5802 depicts transmitting a reservation relay response message. Referring to FIG. 30, gateway node D0 may transmit a reservation relay response message back to gateway node E0, to the selected relay node D2 and to the next hop gateway node C0. These transmissions may consume a sub-slot within the G1 bootstrap slots as node D0 is a G1 gateway node. The response message sent back to node E0 may provide information regarding which relay node has been selected and its position information. A message sent to node D2 may indicate it has been selected as a relay node and contains all pertinent information (e.g. such as Sequence Number, Source ID, and Destination ID to uniquely identify the reservations, and position and velocity information of the relay's destination node). A reservation relay response message may be sent to the next-hop gateway node C0 directing it to determine the next appropriate relay node.

Figure 31:
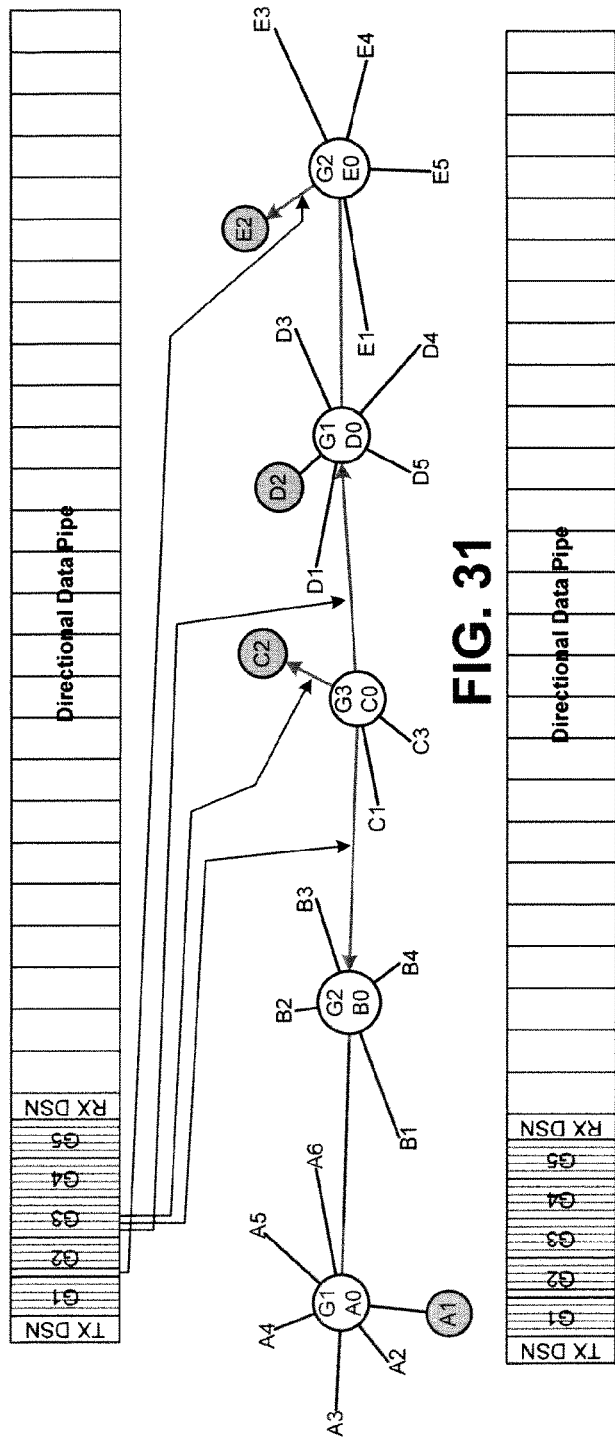

Referring to FIG. 31, similar processing may be performed by gateway node C0 when it receives the reservation relay response message from gateway node D0 as described above. C0 may select a relay node (e.g. node C2), and sends a Reservation Relay Response message to B0, C2, and D0. Additionally, during this same gateway bootstrap frame the Reservation Relay Response message sent by D0 in the previous section may arrive at destination node E2.

Figure 32:
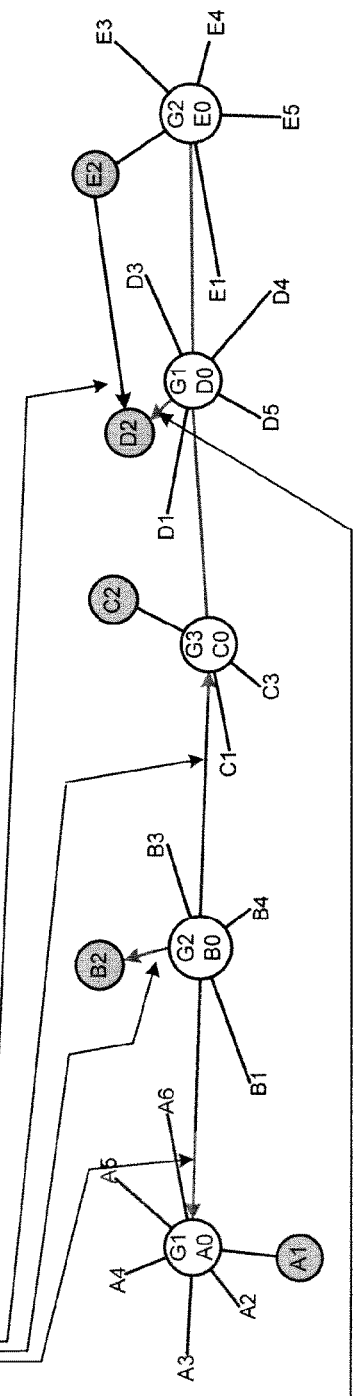

Referring to FIG. 32, gateway node B0 selects an appropriate relay node once it receives the Reservation Relay Response message from C0 and sends out its own Reservation Relay Response message to nodes A0, B2, and C0. During this same gateway bootstrap frame, the Reservation Relay Response message sent by node C0 in the previous section may arrive at destination node D2. Node E2 may utilizes the TX DSN slot to advertise the available slots it can receive data from D2.

Figures 33, 34:
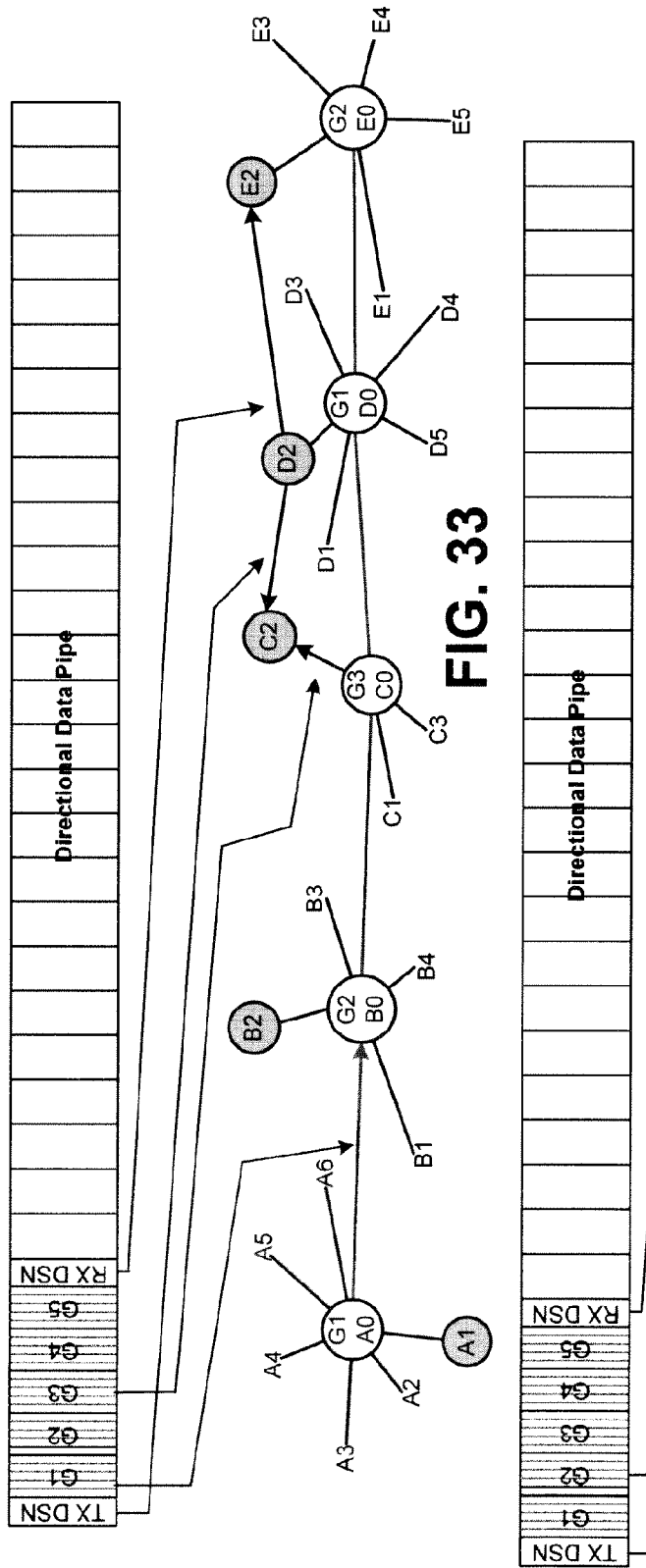

Referring to FIG. 33, gateway node A0 sends a Reservation Response message to B0 without selecting a relay node since A1 is the source of the Reservation Request. During this same gateway bootstrap frame the Reservation Relay Response message sent by B0 in the previous section may arrive at destination node C2. Node D2 may utilizes the TX DSN slot to advertise the available slots it can receive data from C2 and uses the RX DSN slot to confirm which slots will be used for transmissions from D2 to E2. The slots confirmed in the RX DSN slot will be a subset of those advertised by E2 in the TX DSN slot in the previous section.

Referring to FIG. 34, node C2 utilizes the TX DSN slot to advertise the available slots it can receive data from B2 and uses the RX DSN slot to confirm which slots will be used for transmissions from C2 to D2. The slots confirmed in the RX DSN slot will be a subset of those advertised by D2 in the TX DSN slot in the previous section.

Referring to FIG. 35, node B2 utilizes the TX DSN slot to advertise the available slots it can receive data from A1 and uses the RX DSN slot to confirm which slots will be used for transmissions from B2 to C2. The slots confirmed in the RX DSN slot will be a subset of those advertised by C2 in the TX DSN slot in the previous section.

Referring to FIG. 36, node A1 uses the RX DSN slot to confirm which slots will be used for transmissions from A1 to B2. The slots confirmed in the RX DSN slot will be a subset of those advertised by B2 in the TX DSN slot in the previous section.

Figure 37:
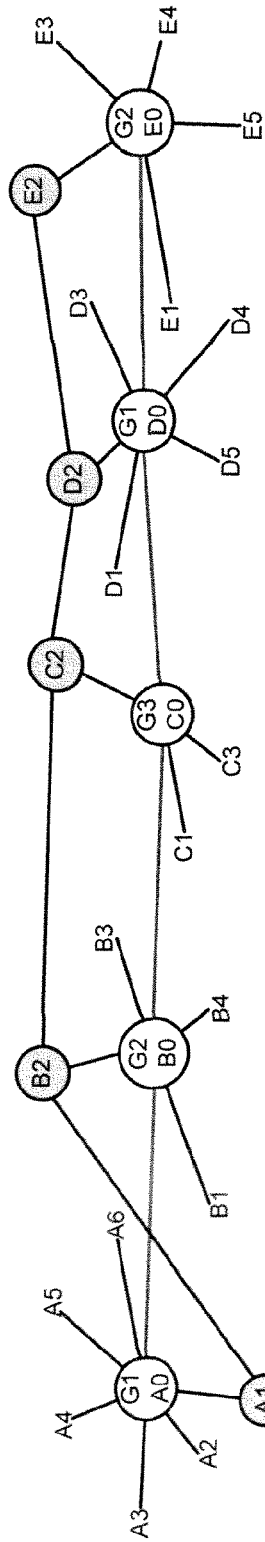

Referring to FIG. 37, a complete data path is now setup (e.g. nodes, A1→B2→C2→D2→E2).

Following reservation setup, it may be the case that the D-MANET topology may change and previous reservation links may become non-optimal or be broken as nodes move away from each other. Similarly, as nodes move toward each other intermediary reservation links may become unnecessary in a multi-hop communication topology.

FIG. 59 illustrates alternative embodiments of the example operational flow 5700 of FIG. 57. FIG. 59 illustrates example embodiments where the operational flow 5700 may include at least one additional operation. Additional operations may include an operation 5902, and/or an operation 5904, and/or an operation 5906.

Figure 38:
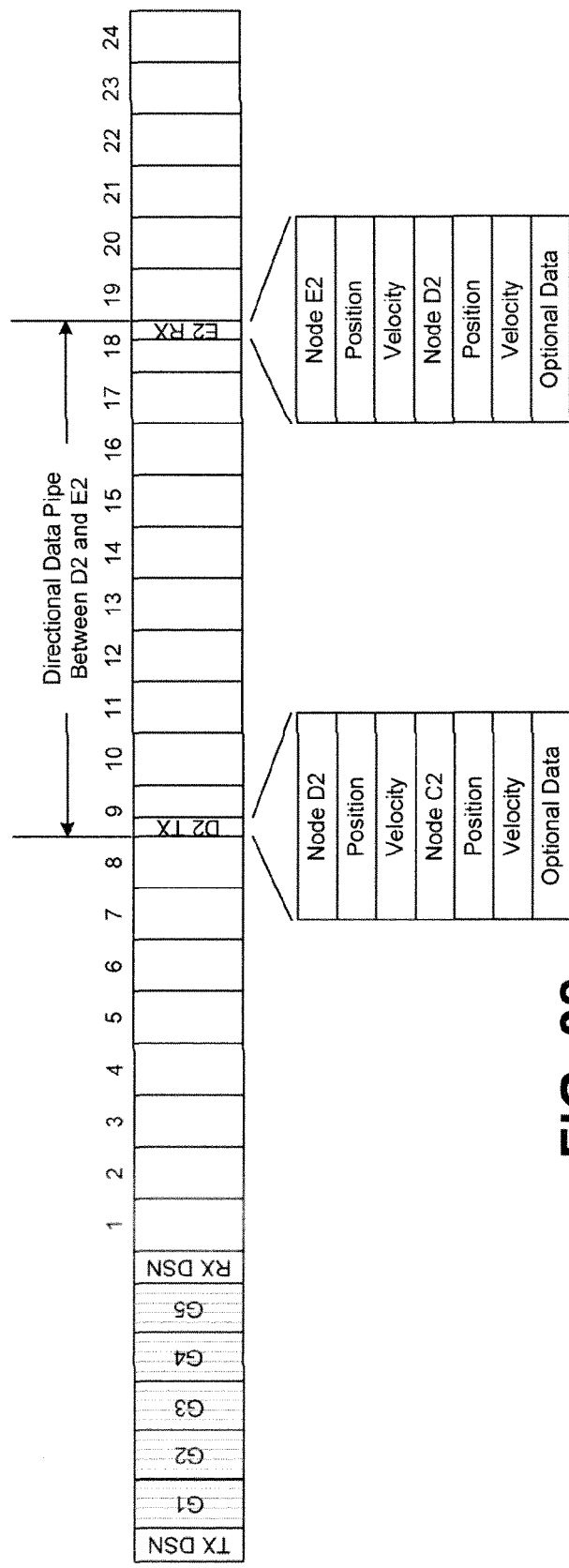
FIG 38 illustrates a directional data pipe frame structure.
Figures 39, 40:
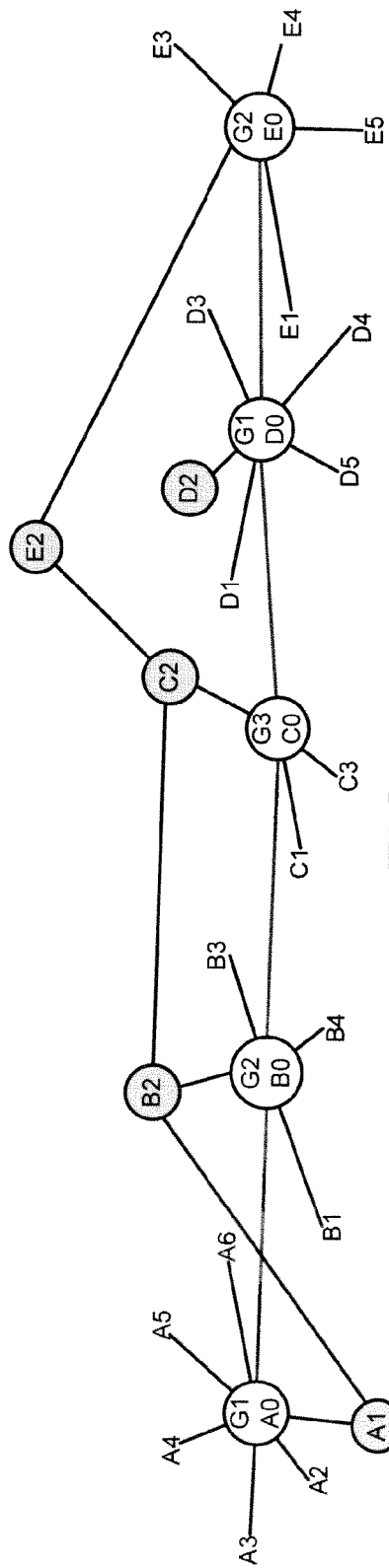
FIG. 39 illustrates an exemplary gateway bootstrap message.
FIG. 40 illustrates a D-MANET.

Nodes that communicate along the data path have to dynamically communicate on the fly to maintain a good communication link in the presence of mobility. Therefore, small portions of the beginning and ending of the reservation slots may be allocated to dynamic on the fly bootstrap (flystrap) messages to allow this type of information to be passed between the transmitting and receiving nodes of the reservation. The beginning of the reservation will be allocated to the transmitter of the reservation to allow the transmitter to continue the transmission. The very end of the reservation slots will be used for the receiving node to respond with its new position velocity information for the next frame's transmission. For example, consider again the topology of FIG. 37 with nodes D2 and E2 agreeing to some set of data time slots (e.g. slots are 9-18) as shown in FIG. 38. At the very beginning of slot 9 node D2 embeds flystrap information to allow node E2 to successfully communicate with D2. At the very end of slot 18 node E2 embeds flystrap information to allow node D2 to successfully communicate with E2. Referring to FIG. 39, an exemplary structure of a generic flystrap message is illustrated. The Optional Data field is used to allow nodes to dynamically reassign reservations to a more optimal data path if it is available. A node such as D2 transmits its previous relay node C2 as part of its flystrap to allow node E2 to reassign reservations directly to node C2 if the situation occurs.

Operation 5902 depicts detecting when at least one of the first node and the second node is approximately the same distance away from the relay node and a non-relay node. Referring to FIG. 40, it may be the case that a destination node (e.g. node E2) in a multi-hop communication may move to a position such that it is approximately the same distance away from two intermediate nodes (e.g. nodes C2 and D2) as determined by position information contained in the bootstrap messages described above. In such a case, more optimal data path would be from node C2 directly to node E2, freeing up node D2 to handle other communications.

Operation 5904 depicts enabling the non-relay node as a relay node. Referring to FIG. 41, node D2 may act as an arbiter and transmits a bit in its D2 TX slot to E2 and a similar bit in its D2 RX slot to node C2 to alert each of them a more optimal path exists directly between node C2 and node E2. Referring to FIG. 42, nodes C2 and E2 may then use the TX/RX DSN slots to negotiate time slots between themselves. Referring to FIG. 43, communication may continues through node D2 until node C2 and node E2 have agreed on data time slots between themselves as described above.

Operation 5906 depicts disabling the relay node. Node E2 may notify node D2 in the E2 RX slot it will no longer be expecting to receive data from node D2, and node C2 may notify node D2 in the C2 TX slot it will no longer be transmitting to node D2. Referring to FIG. 44, node D2 may acknowledge first to its relay node C2 there is be no further communications in the node D2 RX slot and then may make an acknowledgement to node E2 in the node D2 TX slot shown below to complete all communications with E2. The order that D2 acknowledges the new communication link between node C2 and E2 is important to insure there is no lost data. A node, such as node D2, that is dropping out of a communications path will always acknowledge the node it receives data from first, and then acknowledge the node it transmits to last.

Figure 45:
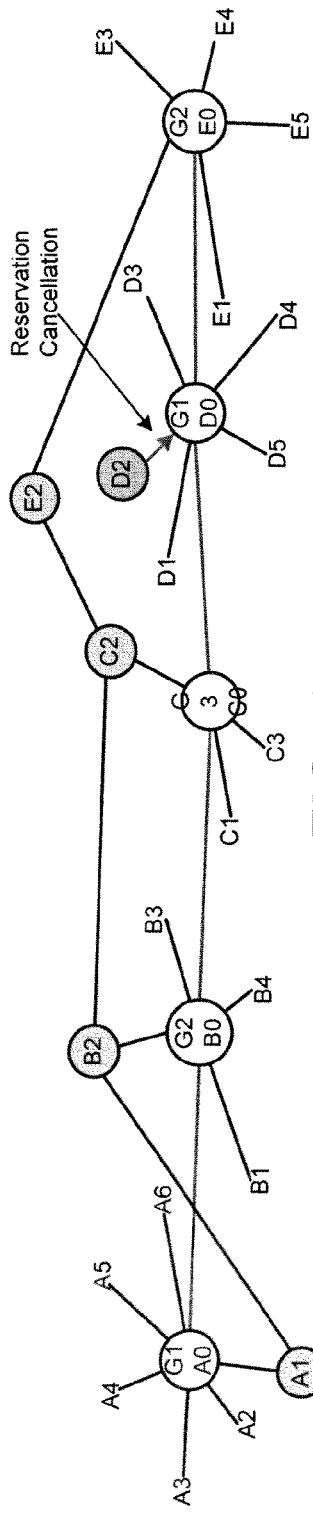
FIGS. 45, 46, 47, 48 illustrate a D-MANET.

Referring to FIG. 45, node D2 sends a reservation cancellation message to its gateway node to alert it of freed up resources for future reservations. Referring to FIG. 26, an exemplary structure of a reservation cancelation utility message is illustrated.

Alternately, it may be the case that Nodes may also move away from each other causing links between relay nodes or the destination nodes to be broken.

FIG. 60 illustrates alternative embodiments of the example operational flow 5700 of FIG. 57. FIG. 60 illustrates example embodiments where the operational flow 5700 may include at least one additional operation. Additional operations may include an operation 6002, and/or an operation 6004, and/or an operation 6006.

Figure 46:
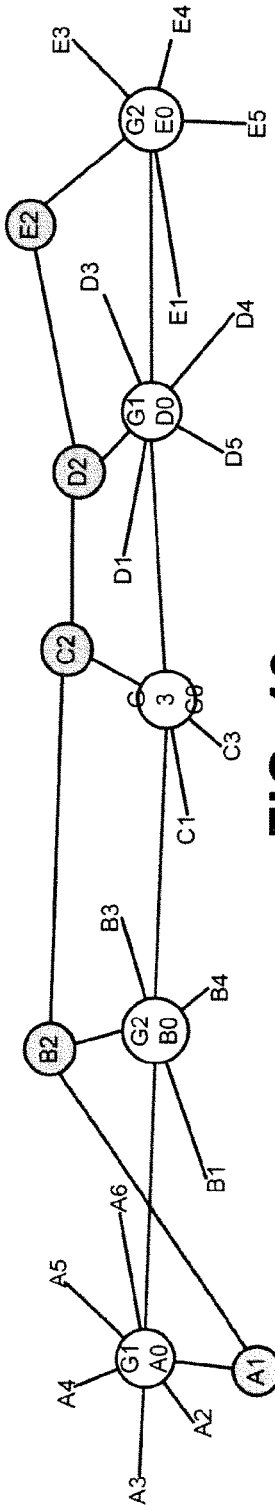
Figure 47:
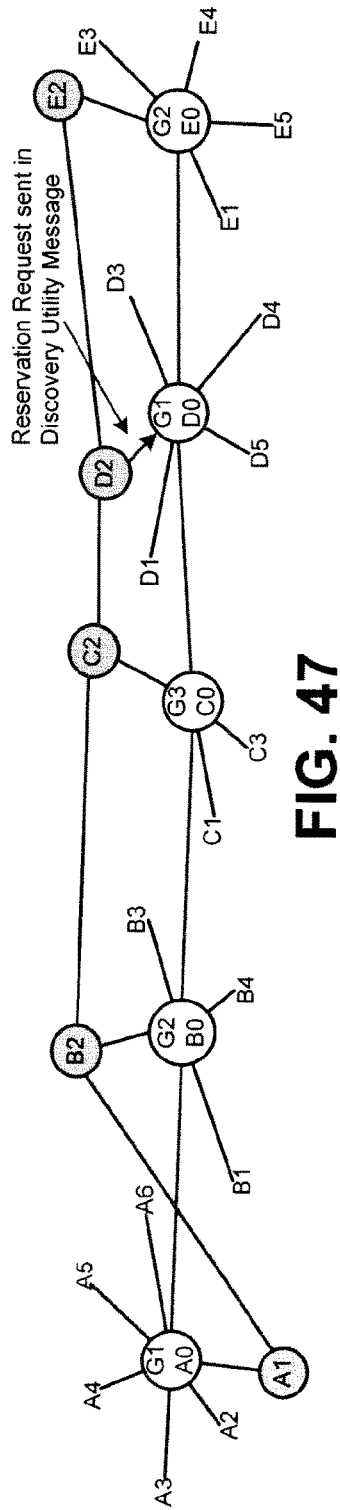

Operation 6002 depicts detecting a degraded reservation relay node. Consider an initial topology as in FIG. 46. Then, as shown in FIG. 47, node E2 may move to the right and away from node D2. Node D2 may detect from the flystrap slots (as described above), that E2 is moving such that the distance between them is increasing.

Operation 6004 depicts detecting an intermediate non-relay node. Node D2 may make a reservation request through its gateway node D0 to establish a new relay node. Node D0 may communicate with node E0 via the gateway bootstrap and setup a new reservation to support an extension to the existing data path communications.

Figure 48:
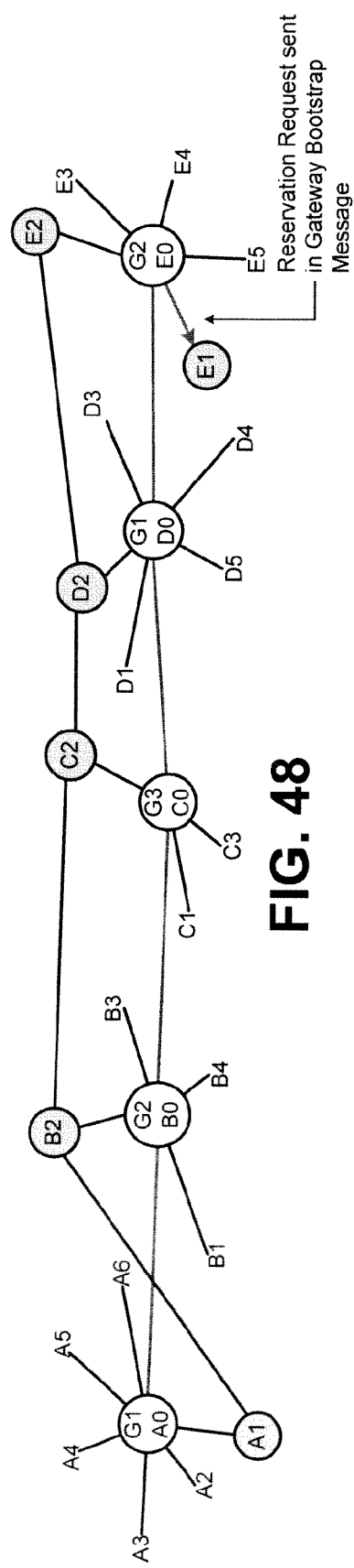

Operation 6006 depicts enabling the non-relay node as a relay node. Referring to FIG. 48, node E0 may use one of it unused gateway bootstrap slots to inform E1 it has been selected to be the new relay node between D2 and E2. The frame structure below shows the gateway bootstrap slots used for D0 to communicate the request to E0 and for E0 to inform E1 of its enlistment. Based on the GIDs both of these transmissions could occur in the same frame. Node E1 may respond to a request from node E0 in a discovery utility message to confirm the relay request. If there is some reason why E1 can not serve as the relay, then it may decline the request and node E0 may make a different node selection. Node E1 may responds back to D0 in the gateway bootstrap slot with all the pertinent information about E1, such as its position, velocity, and vector. Node D0 may then forward the new relay information on to D2.

Figure 49:
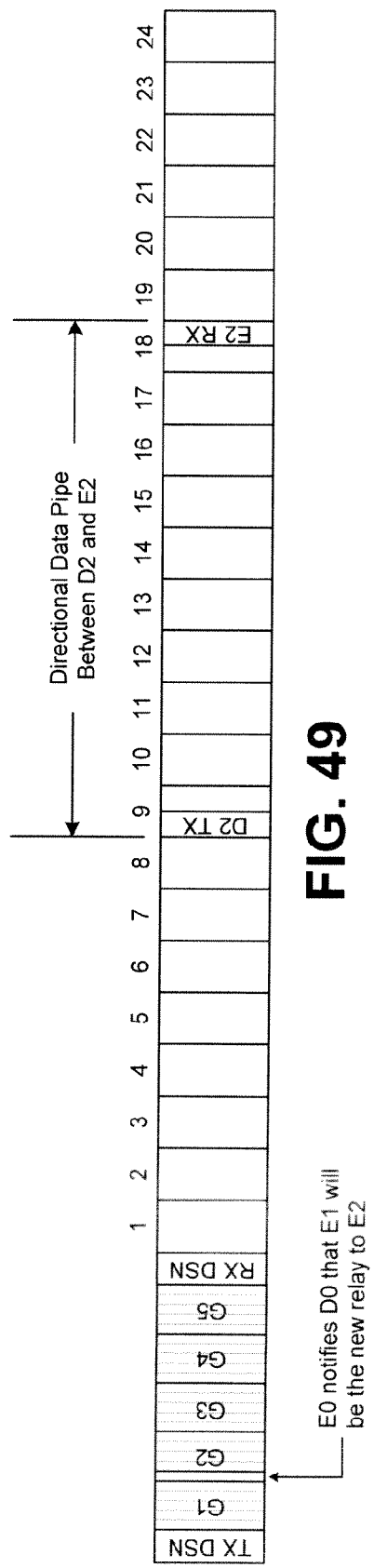
FIG. 49 illustrates a directional data pipe frame structure.

Referring to FIG. 49, node D2 uses the TX DSN slot in the frame structure to negotiate time slots directly with E1. During the same frame E1 is able to respond back to D2 in the RX DSN time slot. Again it should be noted that D2 continues data communications with E2 while the time slot negotiations are in progress between D2 and E1. Finally, D2 and E1 agree on the time slots to use.

Figure 50A:
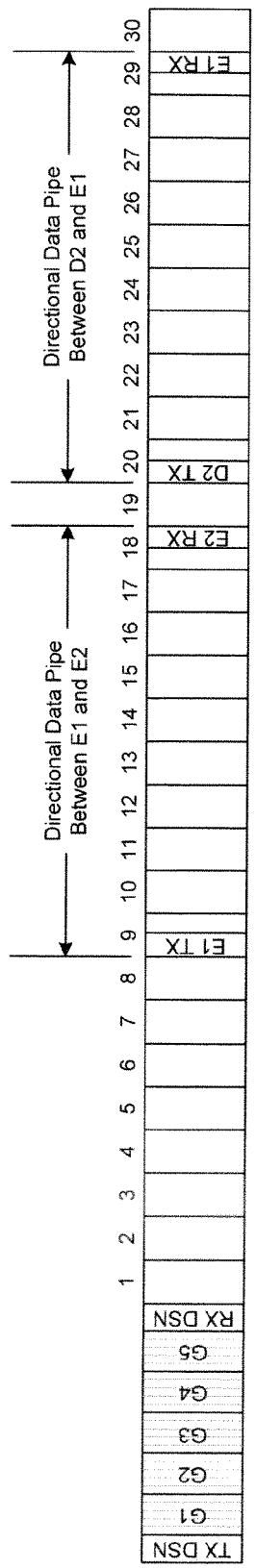
FIG. 50A illustrates a directional data pipe frame structure.
Figure 50B:
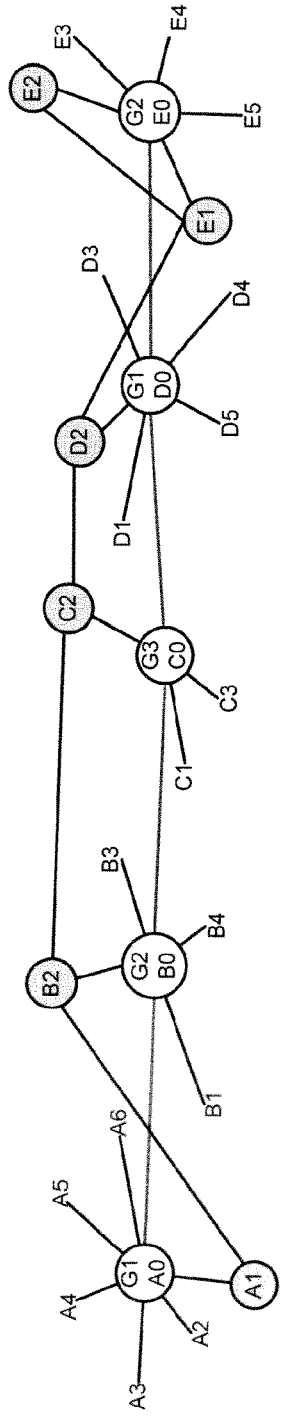
FIG. 50B illustrates a D-MANET.

During the D2 TX slot of the last direct communications between D2 and E2, D2 informs E2 the new communication link will be from D2→E1→E2, effective on the next frame. This requires D2 to negotiate different time slots between E1 than those allocated for E2 to allow E1 to continue to transmit to E2 in the time slots already allocated, provided E1 hasn't already allocated those slots to another reservation. Referring to FIGS. 50A and 50B, a resulting frame structure and communications path are shown.

We claim:

1. A method for directional mobile ad-hoc communication comprising:
   a first transmitting of a join message from a first mobile node to a second mobile node of a directional mobile ad hoc network (D-MANET) comprising transmitting the first join message to establish an infrastructure of communication nodes for inter-group communications of the D-MANET wherein the infrastructure of communication nodes within the D-MANET comprises a cogwheel of aircraft communication nodes;
   a first receiving of an accept message from the second mobile node, the accept message including a time divisional multiple access (TDMA) frame slot reassignment correlating to an available TDMA frame slot in a TDMA frame associated with the second mobile node, wherein the first transmitting or the first receiving is preceded by an omni-directional listening or use of an omni-directional mode;
   reassigning a TDMA frame slot for the first mobile node in the TDMA frame associated with the first mobile node according to the frame slot reassignment received from the accept message of the second mobile node;
   assigning a TDMA frame slot for the second mobile node in the TDMA frame of the first mobile node;
   a second transmitting or a second receiving of at least one of a packet and a third message directionally using at least one of the TDMA frame slot reassignment of the first mobile node and the assigned TDMA frame slot of the second mobile node, the second transmitting or the second receiving being based on a position of a respective mobile node within the D-MANET; and
   transmitting a second join message from a joiner mobile node to a joinee mobile node during a TDMA frame slot associated with the joiner mobile node in a TDMA frame associated with the joiner mobile node, the second join message determining the infrastructure of communication nodes of the D-MANET, and the TDMA frame slot associated with the joiner mobile node comprising a reassigned frame slot of the joiner mobile node based on a TDMA frame offset and the infrastructure of communication nodes.

2. The method of claim 1, further comprising:
   receiving a TDMA frame offset from the second mobile node; and
   syncing the TDMA frame associated with the first mobile node according to the TDMA frame offset.

3. The method of claim 1, wherein the reassigned frame slot is a first TDMA frame slot reassignment, the method further comprising:
   transmitting a reconfigure message including a second TDMA frame slot reassignment for a third node from the joiner mobile node to the third node, wherein the third message comprises the reconfigure message.

4. The method of claim 1, further comprising:
   transmitting an update message including node position and velocity data during a reassigned TDMA frame slot for the first mobile node, wherein the third message comprises the update message and the node position and velocity data comprises the position and a velocity of the respective mobile node within the D-MANET.

5. The method of claim 1, further comprising:
   determining a gateway node identification (GID) for the second mobile node.

6. The method of claim 1, further comprising:
   transmitting a bandwidth reservation request message from the first mobile node to the second mobile node;
   receiving a bandwidth reservation response message from the second mobile node; and
   enabling a relay node, wherein the third message comprises the bandwidth reservation request message.

7. The method of claim 6, wherein the enabling a relay node further comprises:
   transmitting a reservation relay response message.

8. The method of claim 6, further comprising:
   detecting when at least one of the first mobile node and the second mobile node is approximately the same distance away from the relay node and a non-relay node;
   enabling the non-relay node as a relay node; and
   disabling the relay node.

9. The method of claim 6, further comprising:
   detecting a degraded reservation relay node;
   detecting an intermediate non-relay node; and
   enabling the non-relay node as a relay node.

10. The method of claim 1, wherein the first receiving of an accept message from the second mobile node further comprises receiving data regarding a position of the second mobile node in the accept message.

11. The method of claim 10, further comprising:
    listening, at the first mobile node, via an omni-directional antenna prior to sending the join message, wherein the second transmitting or the second receiving of the at least one of a packet and a third message directionally comprises transmitting the at least one of the packet and the third message via a directional antenna during a reassigned TDMA frame slot in the TDMA frame associated with the first mobile node according to the position of the respective mobile node, and wherein the respective mobile node is the second mobile node.

12. The method of claim 11, further comprising:
    receiving instructions from a directional antenna controller of the first node to transmit the packet in a direction using the reassignment of the TDMA frame slot.

13. The method of claim 12, further comprising:
    transmitting the packet according to the position and a velocity in the direction using the directional antenna controller and the directional antenna.

14. The method of claim 1, wherein the TDMA frame offset and a portion of the infrastructure of communication nodes is indicated by a bitmap provided to the joinee mobile node in the join message of the joiner mobile node.

15. The method of claim 1, further comprising: discovering by the joinee mobile node or a third mobile node neighboring nodes for the frame slot reassignment of the joiner node or for the assignment of the TDMA frame slot of the joinee mobile node.

16. The method of claim 15, further comprising:
negotiating one or more time slots for the reassignment of the TDMA frame slot of the joiner mobile node or for the assignment of the TDMA frame slot of the joinee mobile node.

17. The method of claim 16, further comprising:
synchronizing by the joinee mobile node or a third mobile node a time for transmitting or receiving the packet.

18. A system for directional mobile ad-hoc communication comprising:
at least one computing device programmed for:
a first transmitting of a join message from a first mobile node to a second mobile node of a directional mobile ad hoc network (D-MANET) comprising transmitting the first join message to establish an infrastructure of communication nodes for inter-group communications of the D-MANET wherein the infrastructure of communication nodes within the D-MANET comprises a cogwheel of aircraft communication nodes;
a first receiving an accept message from the second mobile node, the accept message including a time divisional multiple access (TDMA) frame slot reassignment correlating to an available TDMA frame slot in a TDMA frame associated with the second mobile node, wherein the first transmitting or the first receiving is preceded by an omni-directional listening or use of an omni-directional mode;
reassigning a TDMA frame slot for the first mobile node in the TDMA frame associated with the first mobile node according to the frame slot reassignment received from the accept message of the second mobile node;
assigning a TDMA frame slot for the second mobile node in the TDMA frame of the first mobile node;
a second transmitting or a second receiving of at least one of a packet and a third message directionally using the TDMA frame slot reassignment of the first mobile node and the assigned TDMA frame slot of the second mobile node, the second transmitting or the second receiving being based on a position of a respective mobile node within the D-MANET; and
transmitting a second join message from a joiner mobile node to a joinee mobile node during a TDMA frame slot associated with the joiner mobile node in a TDMA frame associated with the joiner mobile node, the second join message determining the infrastructure of communication nodes of the D-MANET, and the TDMA frame slot associated with the joiner mobile node comprising a reassigned frame slot of the joiner mobile node based on a TDMA frame offset and the infrastructure of communication nodes.

* * * * *